US011667551B2

(12) United States Patent
Nakayama et al.

(10) Patent No.: US 11,667,551 B2
(45) Date of Patent: Jun. 6, 2023

(54) WATER TREATMENT DEVICE, WATER TREATMENT SYSTEM, METHOD OF ASSEMBLING WATER TREATMENT DEVICE, AND WATER TREATMENT METHOD

(71) Applicant: MITSUBISHI ELECTRIC CORPORATION, Chiyoda-ku (JP)

(72) Inventors: Yoshihiro Nakayama, Chiyoda-ku (JP); Seiji Noda, Chiyoda-ku (JP); Tokiko Yamauchi, Chiyoda-ku (JP); Nozomu Yasunaga, Chiyoda-ku (JP); Kenro Mitsuda, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 833 days.

(21) Appl. No.: 16/492,479

(22) PCT Filed: Jan. 22, 2018

(86) PCT No.: PCT/JP2018/001807
§ 371 (c)(1),
(2) Date: Sep. 9, 2019

(87) PCT Pub. No.: WO2018/179717
PCT Pub. Date: Oct. 4, 2018

(65) Prior Publication Data
US 2020/0017379 A1 Jan. 16, 2020

(30) Foreign Application Priority Data

Mar. 28, 2017 (JP) .............................. JP2017-062758

(51) Int. Cl.
*C25B 9/19* (2021.01)
*C25B 1/04* (2021.01)
(Continued)

(52) U.S. Cl.
CPC ........ *C02F 1/4695* (2013.01); *C02F 1/46109* (2013.01); *C02F 1/48* (2013.01);
(Continued)

(58) Field of Classification Search
CPC .. C25B 9/19; C25B 1/04; C25B 15/08; C25B 9/00; C25B 9/70; C25B 13/00;
(Continued)

(56) References Cited

U.S. PATENT DOCUMENTS 3,835,006 A * 9/1974 Fujita ....................... D21C 9/08
162/50
2008/0078673 A1 4/2008 Elson et al.
2017/0121190 A1 5/2017 Ikuno

FOREIGN PATENT DOCUMENTS

CN 102583657 A 7/2012
CN 105668723 A 6/2016
(Continued)

OTHER PUBLICATIONS

International Search Report dated Feb. 20, 2018 in PCT/JP2018/001807 filed Jan. 22, 2018.
(Continued)

*Primary Examiner* — Zulmariam Mendez
(74) *Attorney, Agent, or Firm* — Xsensus LLP

(57) ABSTRACT

Provided is a water treatment device configured to perform a deionization treatment for the water to be treated, and the water treatment device includes a pressing member, a treatment container configured to store the water to be treated, a first electrode and a second electrode accommodated in the treatment container, a separator arranged between the first electrode and the second electrode, and a pair of collectors, which are accommodated in the treatment container, and are configured to apply a voltage to the first electrode and the second electrode. The pressing member is configured to
(Continued)

press the first electrode and the second electrode in the treatment container.

27 Claims, 20 Drawing Sheets

(51) Int. Cl.
    *C25B 13/00*     (2006.01)
    *C02F 1/469*     (2023.01)
    *C02F 1/461*     (2023.01)
    *C02F 1/48*     (2023.01)

(52) U.S. Cl.
    CPC .................. *C02F 2201/002* (2013.01); *C02F 2201/46105* (2013.01)

(58) Field of Classification Search
    CPC .. C25B 9/05; C25B 11/00; C02F 2201/46115; C02F 1/4618; C02F 1/46109; C02F 2201/4618; C02F 1/4693; C02F 1/4695
    See application file for complete search history.

(56) References Cited

FOREIGN PATENT DOCUMENTS

| | | |
|---|---|---|
| CN | 106348498 A | 1/2017 |
| JP | 3302443 B2 | 4/2002 |
| JP | 2002-336863 A | 11/2002 |
| JP | 2006-136846 A | 6/2006 |
| JP | 4286931 B2 | 4/2009 |
| JP | 2010-505601 A | 2/2010 |
| JP | 2010-533587 A | 10/2010 |
| JP | 5687620 B2 | 3/2015 |
| JP | 2015-196113 A | 11/2015 |

OTHER PUBLICATIONS

Japanese Notifications of Reason for Refusal dated Nov. 26, 2020 in Japanese Application No. 10-2019-7027659.
Chinese Office Action dated Jan. 18, 2022 in Chinese Application No. 201880020157.7.

\* cited by examiner

WATER TREATMENT DEVICE, WATER TREATMENT SYSTEM, METHOD OF ASSEMBLING WATER TREATMENT DEVICE, AND WATER TREATMENT METHOD

TECHNICAL FIELD

The present invention relates to a water treatment device, a water treatment system, a method of assembling a water treatment device, and a water treatment method, with which water to be treated is deionized with use of an electric double-layer capacitor technology.

BACKGROUND ART

Hitherto, there is known a capacitive deionization (CDI) technology using an electric double-layer capacitor technology, for deionization of water to be treated such as seawater or contaminated water with use of a Coulomb force. For example, there exists a flat flow-through electric double-layer capacitor having the following configuration (see, for example, Patent Literature 1). Specifically, activated carbon sheets each mainly made of high specific surface area active carbon are arranged through a separator, which is comprised of an electrically insulating porous flow-through sheet, interposed therebetween. Collectors are arranged on outer sides of the activated carbon sheets, and retaining sheets are arranged on outer sides of the collectors.

Further, there exists a flow-through electric double-layer capacitor having the following configuration (see, for example, Patent Literature 2). Specifically, there are provided separators each comprised of an electrically insulating sheet, electrodes each comprised of an activated carbon layer sheet, and collectors each made of a good electric conductor material which can be brought into intimate contact with the electrode. The collector, the electrode, the separator, and the electrode stacked in the stated order are grouped as one set. After a plurality of the sets are arranged side by side, the collector is arranged as a final sheet. Further, a stacking pressure is set to 0.2 kg/cm²G or larger. Through holes are formed through the sheets at the same positions. With the through holes, inner flow passages are formed.

CITATION LIST

Patent Literature

[PTL 1] JP 3302443 B2
[PTL 2] JP 4286931 B2

SUMMARY OF INVENTION

Technical Problem

In the related-art capacitive deionization device using the electric double-layer capacitor technology, the sheet-like activated carbon layer sheet, which is obtained by adding an additive such as a binder to granular or fibrous activated carbon and forming the activated carbon into a sheet-like shape, is used as the electrode. The activated carbon layer sheet described above has the following problem. The activated carbon layer sheet has reduced activated carbon pores effective in deionization because of closure of the pores with the additive. As a result, clearances are reduced to increase a pressure loss at the time of introduction of the water to be treated. As a result, there arises a problem in that desired deionization performance is not obtained. Meanwhile, when the use of the additive is avoided in view of the pressure loss, a contact area between the granular or fibrous activated carbon used to form the electrode is reduced to increase an electric resistance. Thus, there arises a problem in that the desired deionization performance is not obtained.

The present invention has been made to solve the problems described above, and has an object to provide a water treatment device, a water treatment system, a method of assembling a water treatment device, and a water treatment method, with which a pressure loss during a deionization treatment for water to be treated is suppressed to enable maximum use of pores of a conductive material.

Solution to Problem

The water treatment device according to one embodiment of the present invention is configured to perform the deionization treatment for the water to be treated, and includes a pressing member, a treatment container configured to store the water to be treated, a first electrode and a second electrode accommodated in the treatment container, a separator arranged between the first electrode and the second electrode, and a pair of collectors, which are accommodated in the treatment container, and are configured to apply a voltage to the first electrode and the second electrode. The pressing member is configured to press the first electrode and the second electrode in the treatment container.

Advantageous Effects of Invention

The water treatment device according to one embodiment of the present invention includes electrodes comprised solely of the conductive material. In this manner, closure of pores of the conductive material with, for example, an additive can be prevented to suppress the pressure loss during the deionization treatment for the water to be treated. As a result, the use of the pores of the conductive material can be maximized.

DESCRIPTION OF EMBODIMENTS

Preferred embodiments of a water treatment device and a water treatment method of the present invention are now described with reference to the drawings.

First Embodiment

Figure 1:
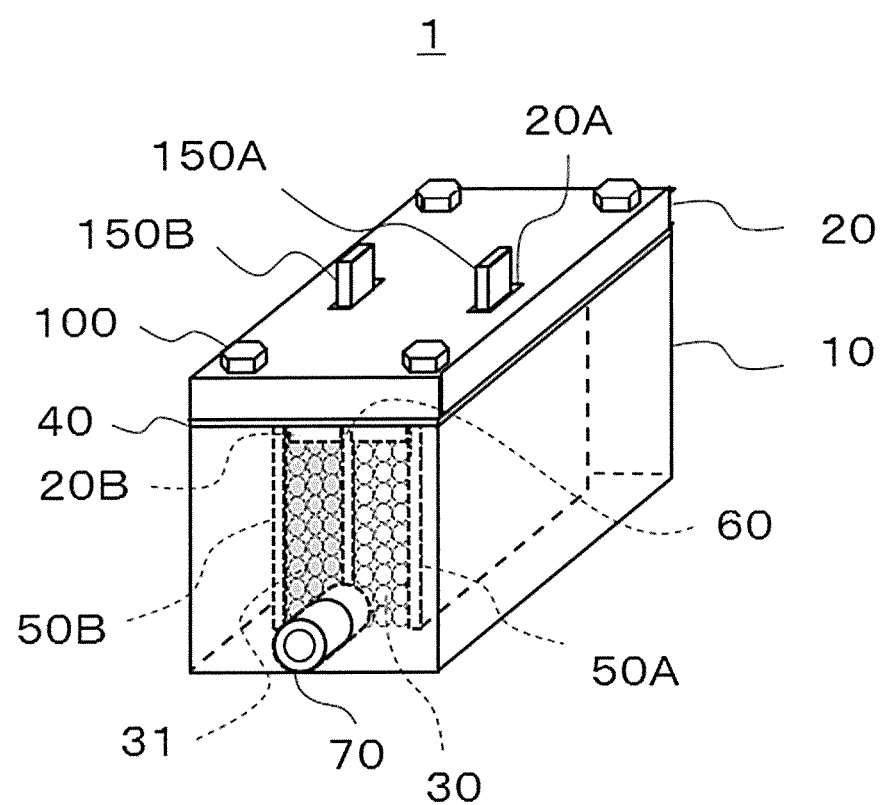
FIG. 1 is a perspective view for illustrating a water treatment device in a first embodiment of the present invention.
Figure 2:
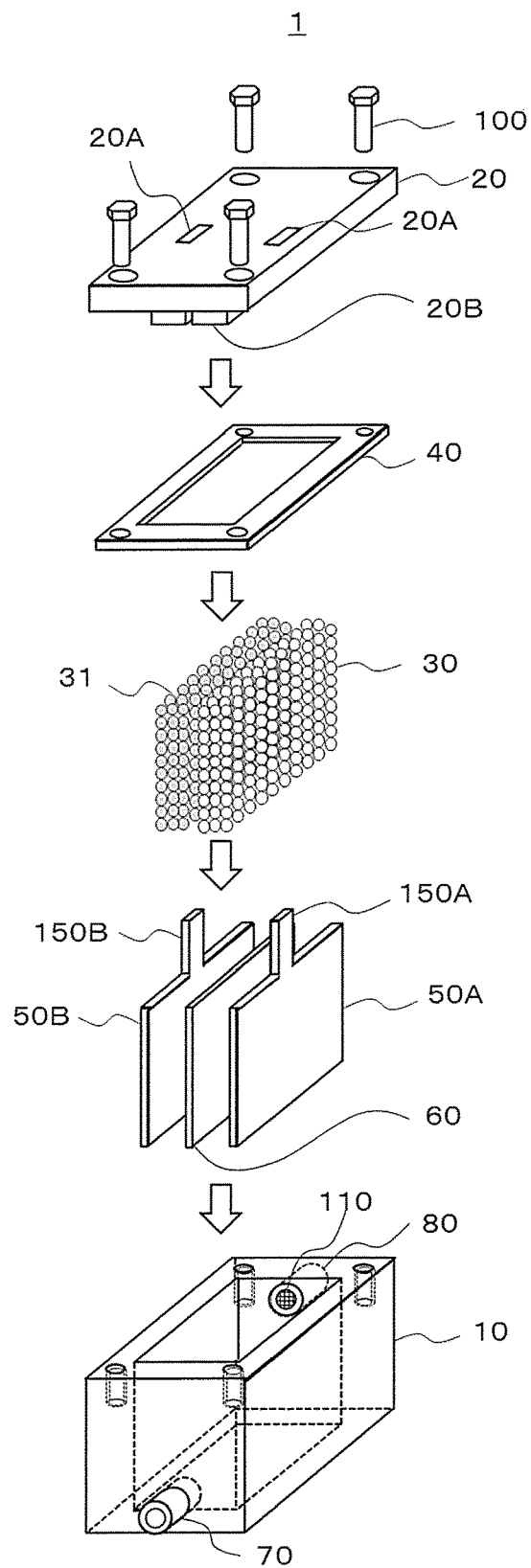
FIG. 2 is an exploded view of the water treatment device in the first embodiment of the present invention.
Figure 3:
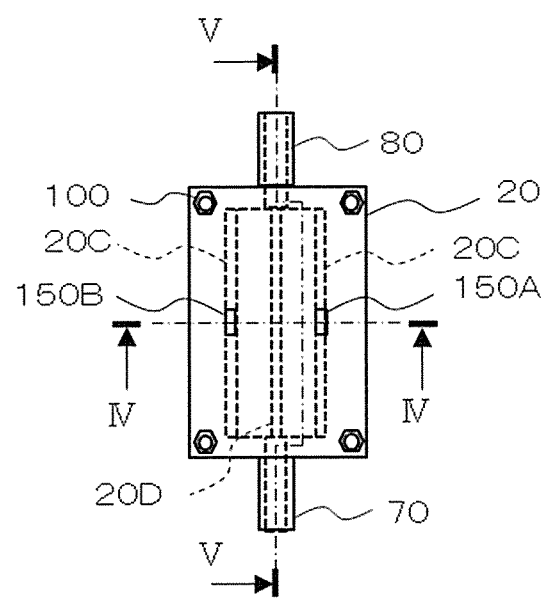
FIG. 3 is a top view of the water treatment device in the first embodiment of the present invention.
Figure 4:
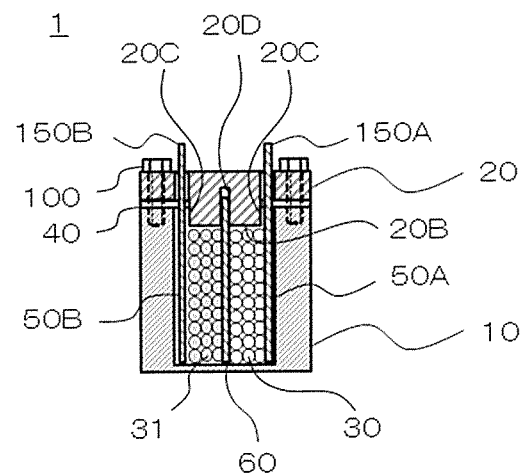
FIG. 4 is a sectional view of the water treatment device taken along the line IV-IV of FIG. 3.
Figure 5:
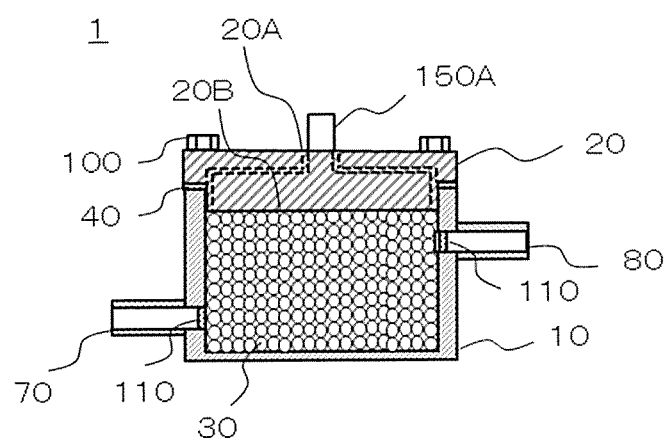
FIG. 5 is a sectional view of the water treatment device taken along the line V-V of FIG. 3.

FIG. 1 is a perspective view for illustrating a water treatment device 1 in a first embodiment of the present invention, and FIG. 2 is an exploded view of the water treatment device 1. FIG. 3 is a top view of the water treatment device 1 of the first embodiment. FIG. 4 is a sectional view of the water treatment device taken along the line IV-IV of FIG. 3, and FIG. 5 is a sectional view of the water treatment device taken along the line V-V of FIG. 3.

As illustrated in FIG. 1 and FIG. 2, the water treatment device 1 includes a treatment container 10 and a lid 20. The treatment container 10 is configured to treat water to be treated. A packing 40 is arranged between the treatment container 10 and the lid 20. The lid 20 is fastened onto the treatment container 10 with four screws 100. The treatment container 10 has an inlet port 70 and an outlet port 80. The inlet port 70 is configured to introduce the water to be treated. The outlet port 80 is configured to discharge the water to be treated.

In the treatment container 10, a pair of collectors 50A, 50B are arranged through a separator 60 interposed therebetween. A first electrode 30 is arranged between the collector 50A and the separator 60, whereas a second electrode 31 is arranged between the collector 50B and the separator 60.

As illustrated in FIG. 3 and FIG. 4, a pair of collector grooves 20C, 20C and a separator groove 20D are formed in the lid 20. The collector grooves 20C, 20C receive upper ends of the pair of collectors 50A and 50B inserted thereinto. The separator groove 20D receives an upper end of the separator 60 inserted thereinto. The pair of collectors 50A and 50B are positioned by the collector grooves 20C, 20C, whereas the separator 60 is positioned by the separator groove 20D.

As a material of the treatment container 10 and the lid 20, a resin material having an insulating property or a metal with an electrically insulating coating applied thereon is used so as to prevent short-circuiting between the first electrode 30 and the second electrode 31.

A voltage is applied to the first electrode 30 and the second electrode 31 respectively through the collectors 50A and 50B to adsorb ions in the water to be treated. As a conductive material for comprising the first electrode 30 and the second electrode 31, for example, activated carbon, porous carbon, porous conductive beads, or a porous metal, which has electrical conductivity and a large specific surface area, is used so as to increase a capacity as a capacitor. Shapes of the conductive materials described above include a powdery shape, a granular shape, and a fibrous shape. In a case of the powdery shape and the granular shape, an outer diameter thereof falls within a range of from 100 nm to 10 mm. In a case of the fibrous shape, a thickness thereof falls within a range of from 1 µm to 50 µm.

For example, cloth or a filter, which is comprised of any one of the conductive materials described above, may be used.

An interval between each of the collectors 50A and 50B and the separator 60 is only required to be set to 1 time to 100 times, desirably, 5 times to 20 times as large as a diameter of the conductive material for comprising the first electrode 30 and the second electrode 31. When the interval is smaller than the diameter of the conductive material, the electrode cannot be arranged between each of the collectors 50A and 50B and the separator 60. When the interval is larger than 100 times the diameter of the conductive material, a thickness of each of the electrodes made of the conductive material is increased. Then, an electric resistance of the electrodes increases to lower deionization performance.

The collectors 50A and 50B are configured to apply the voltage to the first electrode 30 and the second electrode 31, respectively, and to collect the voltage therefrom at the time of discharging. As a material for comprising the collectors 50A and 50B, for example, a graphite sheet, a grafoil (commercial name), a conductive rubber, or a metal sheet or plate interposed between or covered with one of the materials described above is used. As described above, the collectors 50A and 50B are comprised of a material having conductivity and flexibility.

The separator 60 is configured to prevent the short-circuiting between the first electrode 30 and the second electrode 31. As a material for comprising the separator 60, for example, a material having an electric insulating property, which is permeable to a liquid and does not allow the conductive material to pass therethrough, for example, a paper filter, a porous film, a non-woven fabric, or a blowing agent, is used.

The inlet port 70 of the treatment container 10 is configured to introduce the water to be treated into the treatment container 10. The inlet port 70 is arranged through a side surface of the treatment container 10 so that the water to be treated can be directly introduced to the first electrode 30 and the second electrode 31, or the first electrode 30, the second electrode 31, and the separator 60.

The outlet port 80 of the treatment container 10 is configured to discharge the water to be treated to an outside of the treatment container 10. The outlet port 80 is arranged through a side surface of the treatment container 10 so that the water to be treated can be directly discharged from the first electrode 30 and the second electrode 31, or the first electrode 30, the second electrode 31, and the separator 60.

The inlet port 70 and the outlet port 80 are comprised of, for example, a resin material having an insulating property such as an acrylic resin or a metal covered with an electric insulating coating such as fluorine-coated stainless steel so as to prevent the short-circuiting between the first electrode 30 and the second electrode 31.

Outflow prevention members 110 are mounted between the inlet port 70 and the treatment container 10 and between the outlet port 80 and the treatment container 10 so as to prevent the conductive material of the first electrode 30 and the second electrode 31 from flowing out of the treatment container 10. The outflow prevention members 110 are comprised of, for example, a resin net having an insulating property or a metal net covered with an insulating coating.

In the first embodiment, the inlet port 70 is arranged in a lower part of the treatment container 10, whereas the outlet port 80 is arranged in an upper part of the treatment container 10. However, the positions of the inlet port 70 and the outlet port 80 are not limited thereto. For example, each of the inlet port 70 and the outlet port 80 may be positioned in the vicinity of a center of the side surface of the treatment container 10 or may be arranged through the lid 20.

As illustrated in FIG. 1, FIG. 2, FIG. 4, and FIG. 5, a pressing portion 20B configured to press the first electrode 30 and the second electrode 31 is formed on the lid 20. The pressing portion 20B is formed into a projecting shape toward an inside of the treatment container 10. The pair of collectors 50A and 50B have terminals 150A and 150B, respectively. A pair of through holes 20A, 20A configured to expose the terminals 150A and 150B to the outside are formed through the lid 20. With the application of voltage to the terminals 150A and 150B, the voltage is applied to the first electrode 30 and the second electrode 31.

The packing 40 made of an elastic member is arranged between the lid 20 and the treatment container 10. The four screws 100 are inserted into four through holes formed through the lid 20. As the screws 100 are more tightly fastened into screws holes of the treatment container 10, the first electrode 30 and the second electrode 31 in the treatment container 10 are gradually pressed by the pressing portion 20B of the lid 20. The pressing portion 20B of the lid 20 is formed to have such a size that, after the screws 100 are fully fastened, the first electrode 30 and the second electrode 31 are brought into a predetermined pressed state.

As described above, in the water treatment device 1, the lid 20 for the treatment container 10 has the pressing portion 20B configured to bring the first electrode 30 and the second electrode 31 into the predetermined pressed state. With the pressing portion 20B of the lid 20, the pressed state of the first electrode 30 and the second electrode 31 can be maintained while the water to be treated is being treated in the treatment container 10.

When a volume of the first electrode 30 and the second electrode 31 before the lid 20 is mounted onto the treatment container 10 is represented by A and a volume of the first electrode 30 and the second electrode 31 after the lid 20 is mounted onto the treatment container 10 and the screws 100 are fastened is represented by B, the pressed state of the first electrode 30 and the second electrode 31 is specified as a compression ratio P defined by B/A.

When the treatment container 10 is transparent, the compression ratio P of the first electrode 30 and the second electrode 31 before and after the pressing is calculated through actual measurement of dimensions of the first electrode 30 and the second electrode 31. When the treatment container 10 is not transparent, the compression ratio P of the first electrode 30 and the second electrode 31 before and after the pressing is calculated from a difference between a position of the lid 20 in a state of being placed on the first electrode 30 and the second electrode 31 and a position of the lid 20 after the screws 100 are fastened.

The compression ratio P is specified to fall within a range of from 0.5 to 0.99, desirably, from 0.7 to 0.95. When the compression ratio P is larger than 0.99, a contact area between the conductive materials of the first electrode 30 and the second electrode 31 is reduced to increase an electric resistance. Thus, the compression ratio P larger than 0.99 is not preferred. When the compression ratio P is smaller than 0.5, the conductive material is pulverized to flow out of the treatment container 10 together with the water to be treated. Thus, the compression ratio P smaller than 0.5 is not preferred.

The pressed state of the first electrode 30 and the second electrode 31 may be specified based on a value of an electric resistance between the collectors 50A and 50B adjacent to each other or a value of a pressure loss generated at the time of passage of the water to be treated. Further, the above-mentioned pressed state may also be specified based on both of the value of the electric resistance and the value of the pressure loss described above.

When the pressed state is specified based on the value of the electric resistance, the pressed state is specified to fall within a range of from $0.01\Omega$ to $100\Omega$, desirably, from $0.05\Omega$ to $50\Omega$. The separator 60 and the conductive material of the first electrode 30 and the second electrode 31 have resistance, and hence the electric resistance cannot be reduced to be smaller than $0.01\Omega$. Meanwhile, the electric resistance larger than $100\Omega$ is not preferred because the deionization performance degrades.

When the pressed state is specified based on the pressure loss, the pressed state is specified to fall within a range of from 0.001 kPa/m to 1,000 kPa/m, desirably, from 0.05 kPa/m to 500 kPa/m. The conductive material of the first electrode 30 and the second electrode 31 has a water flow resistance. Thus, the pressure loss cannot be reduced to be smaller than 0.001 kPa/m. Meanwhile, when the pressure loss is larger than 1,000 kPa/m, a consumption energy for water injection to the water treatment device increases. Thus, the pressure loss larger than 1,000 kPa/m is not preferred.

As described above, according to the water treatment device 1 of the first embodiment, the collectors 50A and 50B are arranged through the separator interposed therebetween in the treatment container 10. Further, the first electrode 30 is arranged between the collector 50A and the separator 60, whereas the second electrode 31 is arranged between the collector 50B and the separator 60. Then, the first electrode 30 and the second electrode 31 are pressed with the pressing portion 20B formed on the lid 20 for the treatment container 10 to maintain the pressed state.

With the configuration described above, the first electrode 30 and the second electrode 31 can be comprised solely of the conductive material. Further, an additive such as a binder is not used. Thus, closure of pores and clearances in the conductive material can be prevented, and hence the pressure loss can be reduced.

With the pressed state of the first electrode 30 and the second electrode 31 being maintained, the clearances in the conductive material of the first electrode 30 and the second electrode 31 are narrowed. Then, a water flow of the water to be treated into the clearances is narrowed, and hence a distance between the ions in the water to be treated and the conductive material is reduced. As a result, the adsorption of the ions to the first electrode 30 and the second electrode 31 is accelerated to improve the deionization performance.

Further, with the narrowing of the clearances in the first electrode 30 and the second electrode 31, a thickness of the water flow of the water to be treated into the treatment container 10 is uniformized inside the first electrode 30 and the second electrode 31 to improve the deionization performance. Further, the first electrode 30 and the second electrode 31 are maintained in the pressed state, and hence the electric resistance of the first electrode 30 and the second electrode 31 is reduced. Thus, the voltage can be applied to the entirety of the first electrode 30 and the second electrode 31. As a result, the pores of the conductive material of the first electrode 30 and the second electrode 31 can be efficiently used.

According to the water treatment device 1 of the first embodiment, the inlet port 70 for the water to be treated and the outlet port 80 for the treated water are arranged so that the water to be treated flows directly into the separator 60, the first electrode 30, and the second electrode 31. In this manner, the water to be treated can be spread into the entirety of the separator 60, the first electrode 30, and the second electrode 31.

In the first embodiment, the pressing portion 20B is formed on the lid 20. However, the formation of the pressing portions 20 is not limited thereto. For example, the lid 20 and the pressing portion 20B may be comprised as members independent of each other. In this case, it is only required that the pressing portion 20B alone be fastened with the screws 100, and the lid 20 be fixed to the treatment container 10 with another fixing member. Further, in the first embodiment, the separator groove 20D and the pair of collector grooves 20C, 20C are formed in the lid 20. However, the formation of the separator groove 20D and the pair of collector grooves 20C, 20C is not limited thereto. For example, the separator groove 20D and the pair of collector grooves 20C, 20C may be formed on an inner side of the treatment container 10 or may be formed in both of the lid 20 and the treatment container 10.

Figure 6:
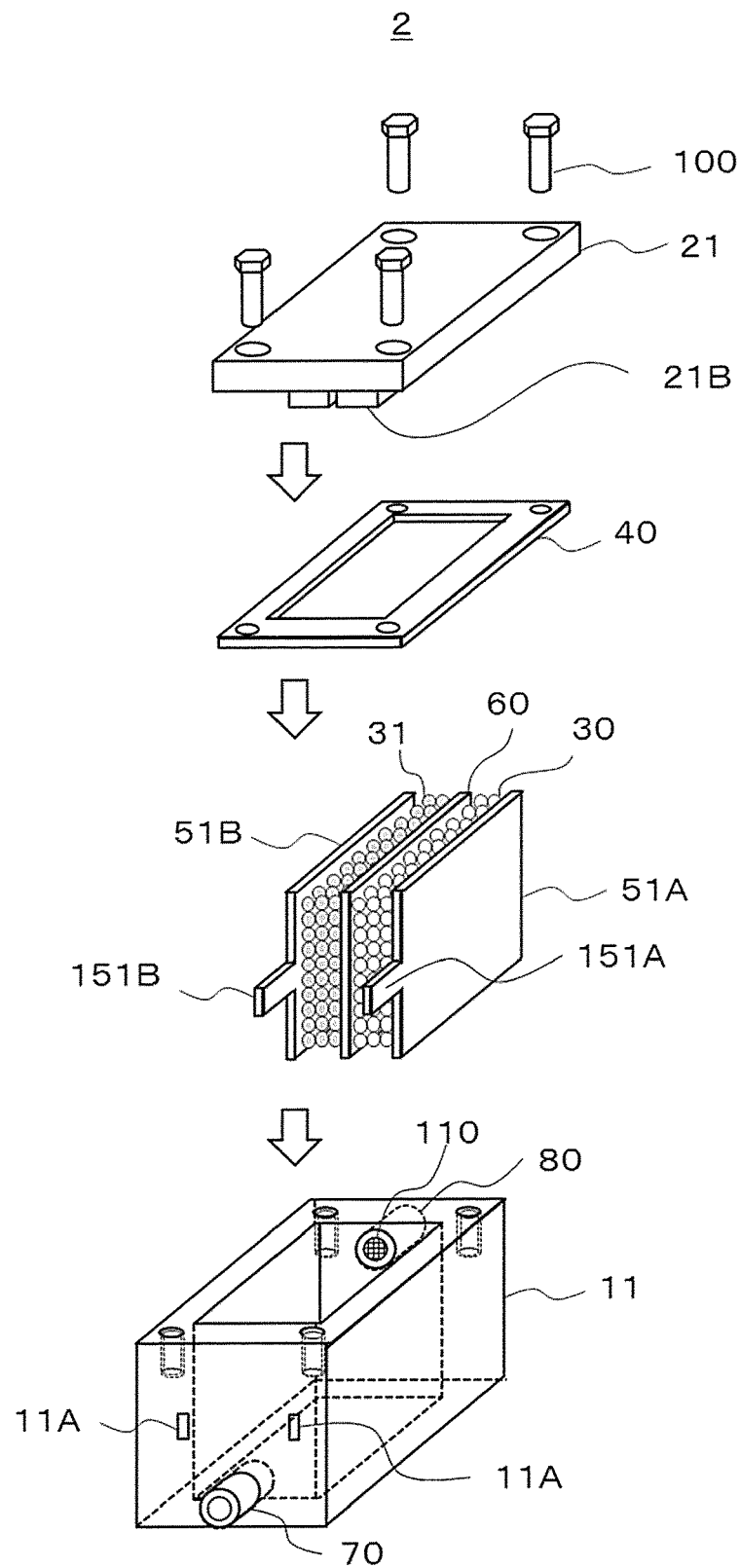
FIG. 6 is an exploded view of a first modification example of the water treatment device in the first embodiment of the present invention.

Further, in the first embodiment, the terminal 150A of the collector 50A and the terminal 150B of the collector 50B are formed so as to project from the through holes 20A, 20A formed through the lid 20. However, the formation of the terminals 150A and 150B is not limited thereto. For example, as in a case of a water treatment device 2 of a first modification example illustrated in FIG. 6, through holes 11A, 11A may be formed through a side surface of a treatment container 11 so that a terminal 151A of a collector 51A and a terminal 151B of a collector 51B project from the through holes 11A, 11A. In this case, an outflow prevention treatment (not shown) is performed on the through holes 11A, 11A so as to prevent the water to be treated from flowing out through a gap between the terminal 151A and the through hole 11A and a gap between the terminal 151B and the through hole 11A.

Figure 7:
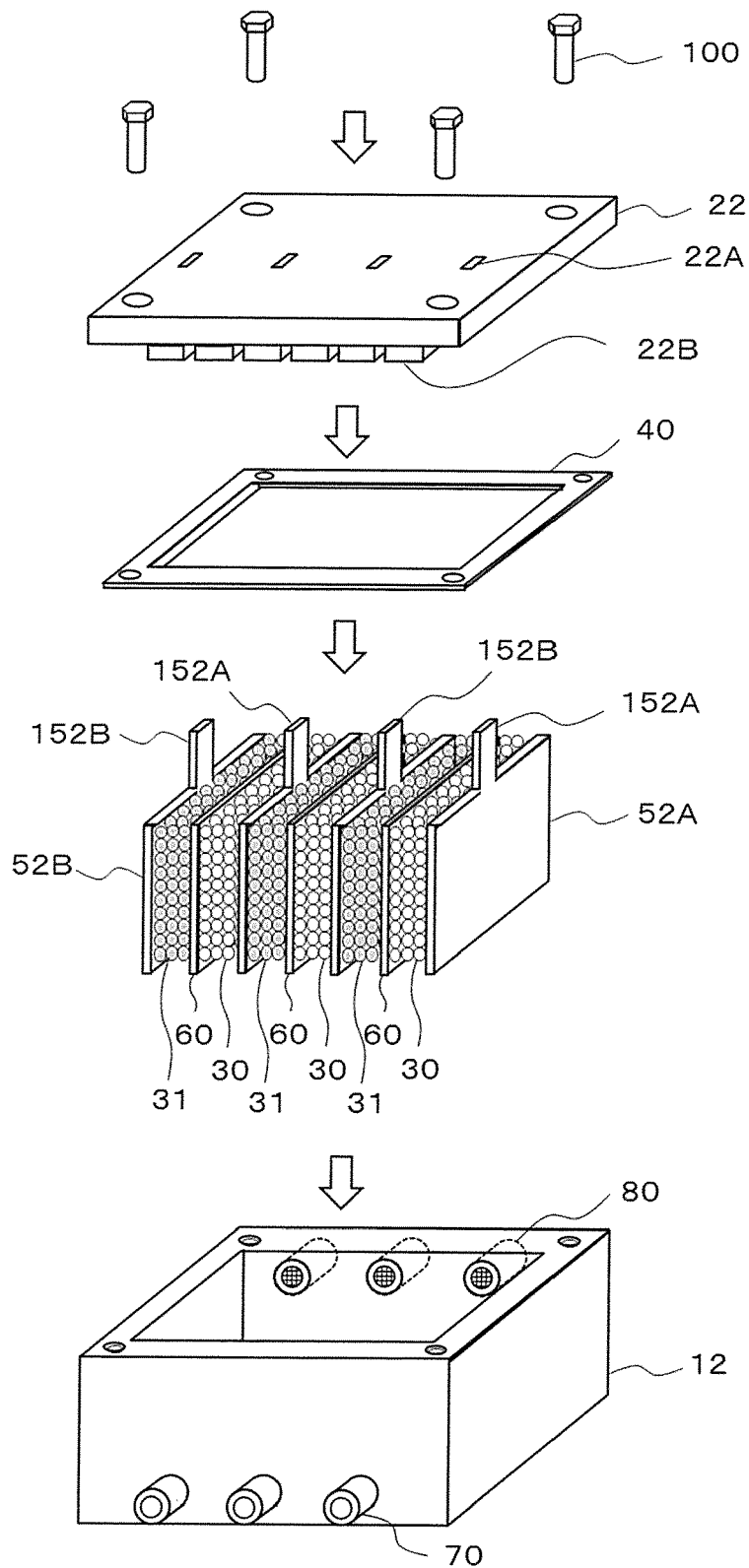
FIG. 7 is an exploded view of a second modification example of the water treatment device in the first embodiment of the present invention.

Further, in the water treatment device 1 of the first embodiment, the pair of collectors 50A, 50B are arranged in the treatment container 10. However, the arrangement of the collectors is not limited thereto. For example, as in a case of a water treatment device 3 of a second modification example illustrated in FIG. 7, two collectors 52A and two collectors 52B may be arranged alternately, and three sets, each including the separator 60, the first electrode 30, and the second electrode 31, are arranged so that each set is located in each space between the collector 52A and the collector 52B. In this case, three of each of the inlet ports 70 and the outlet ports 80 are arranged. With the arrangement described above, capability of treating the water to be treated can be enhanced. The number of each of the collectors 52A and 52B is not limited to two and may be three or more.

Figure 8:
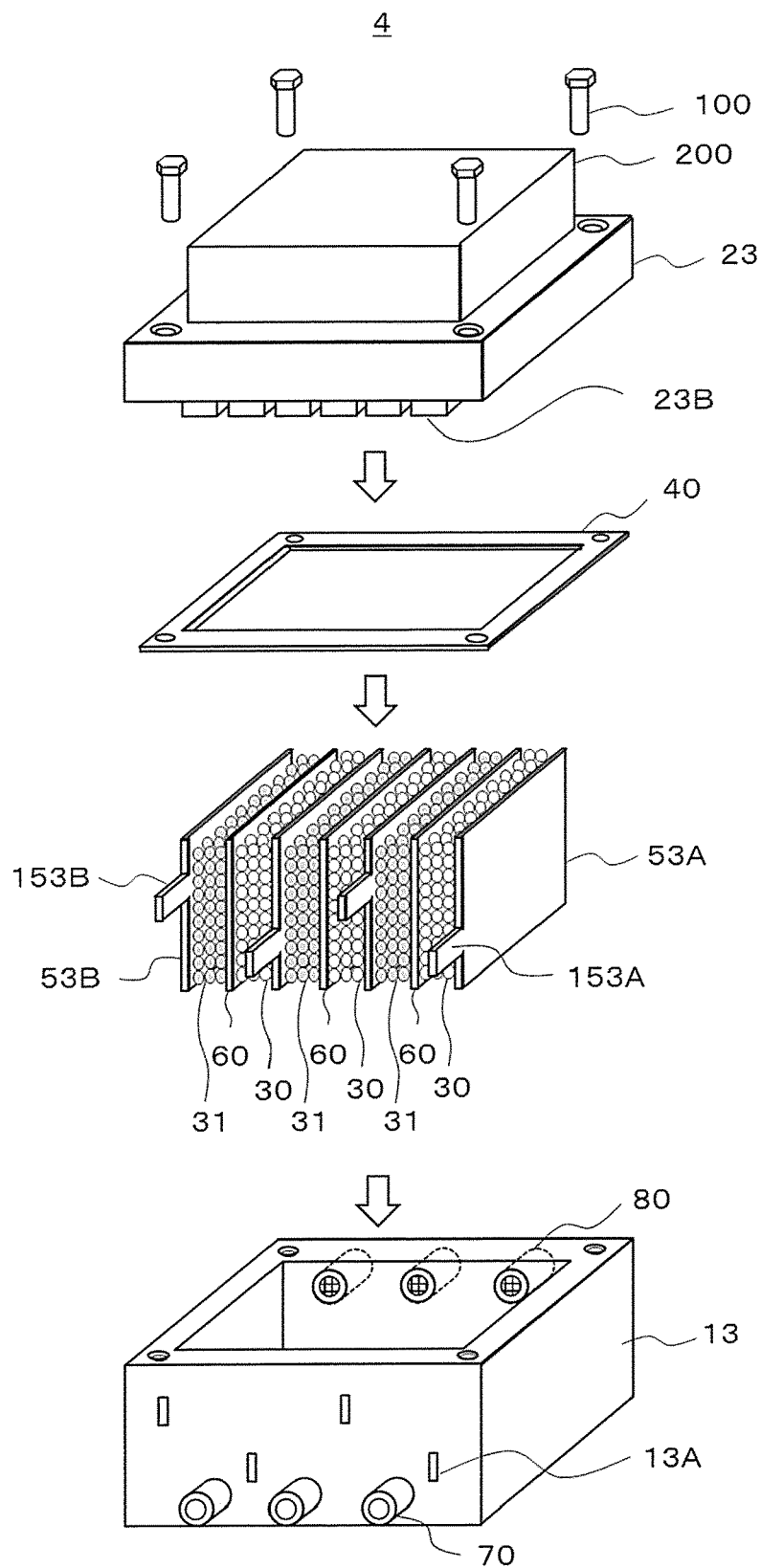
FIG. 8 is an exploded view of a third modification example of the water treatment device in the first embodiment of the present invention.

Further, as in a case of a water treatment device 4 of a third modification example illustrated in FIG. 8, a plurality of the water treatment devices 2 of the first modification example may be arranged side by side. In this case, as illustrated in FIG. 8, it is preferred that a terminal 153A of a collector 53A and a terminal 153B of a collector 53B be formed at positions shifted from the center so that the terminal 153A of the collector 53A and the terminal 153B of the collector 53B are arranged to project from through holes 13A of a treatment container 13 in a staggered manner. With the arrangement described above, a positive side and a negative side of a power supply (not shown) can be prevented from being erroneously connected to the terminals 153A and the terminals 153B.

Further, in the first embodiment, the first electrode 30 and the second electrode 31 are pressed with the pressing portion 20B formed on the lid 20. However, the pressing of the first electrode 30 and the second electrode 31 is not limited thereto. For example, as in the case of the water treatment device 4 illustrated in FIG. 8, a press machine 200 may be mounted onto a lid 23 so that a pressing portion 23B is arranged on the press machine 200. Then, the pressing portion 23B of the press machine 200 may be controlled by a controller (not shown) to press the first electrodes 30 and the second electrodes 31.

As the press machine 200, for example, a hydraulic press machine, a mechanical press machine, or a servo press machine is used. With use of the press machine 200, when the pressing on the first electrodes 30 and the second electrodes 31 by the press machine 200 is released, a space can be formed between upper portions of the first electrodes 30 and the second electrodes 31 and the pressing portion 23B. With the thus formed space, the first electrodes 30 and the second electrodes 31 can be washed with water injected from the inlet port 70 while being expanded without removal of the lid 23. In this manner, the first electrodes 30 and the second electrodes 31 can be uniformly washed.

Now, a method of assembling the water treatment device 1 of the first embodiment is described with reference to FIG. 2 and FIG. 4.

First, in the treatment container 10 of the water treatment device 1 illustrated in FIG. 2, the separator 60 and the collectors 50A and 50B are arranged at predetermined intervals so that the separator 60 is located between the collectors 50A and 50B. Next, the first electrode 30 is arranged between the collector 50A and the separator 60, whereas the second electrode 31 is arranged between the collector 50B and the separator 60. The order of arrangement of the first electrode 30 and the second electrode 31 may be appropriately determined.

Next, after the packing 40 is arranged on the treatment container 10, the lid 20 is placed thereon. At this time, the lid 20 is placed so that the pressing portion 20B formed on the lid 20 are located on the first electrode 30 and the second electrode 31. Further, as illustrated in FIG. 4, an upper end of the separator 60 is inserted into the separator groove 20D formed in the lid 20. Then, the collectors 50A and 50B are inserted into the pair of collector grooves 20C, 20C formed in the lid 20. Further, the terminal 150A of the collector 50A and the terminal 150B of the collector 50B are inserted into the pair of through holes 20A, 20A formed through the lid 20 so that the terminals 150A and 150B project from the lid 20. The outflow prevention treatment (not shown) is performed on the pair of through holes 20A, 20A so as to prevent the water to be treated from flowing out through a gap between the terminal 150A and the through hole 20A and a gap between the terminal 150B and the through hole 20A.

Next, after the screws 100 are mounted into screw holes of the lid 20, the screws 100 are fastened until the compression ratio between the collectors 50A and 50B becomes equal to a predetermined value. Through the process described above, the assembly of the water treatment device 1 is completed.

Instead of specifying the fastening of the screws 100 based on the compression ratio, the screws 100 may be fastened until the electric resistance between the collectors 50A and 50B becomes equal to a predetermined value. Further, instead of specifying the fastening of the screws 100 based on the compression ratio in the method of assembling the water treatment device 1, the screws 100 may be fastened until a difference between a pressure given before the inlet port 70 and a pressure given after the outlet port 80 becomes equal to a predetermined value.

Second Embodiment

Figure 9:
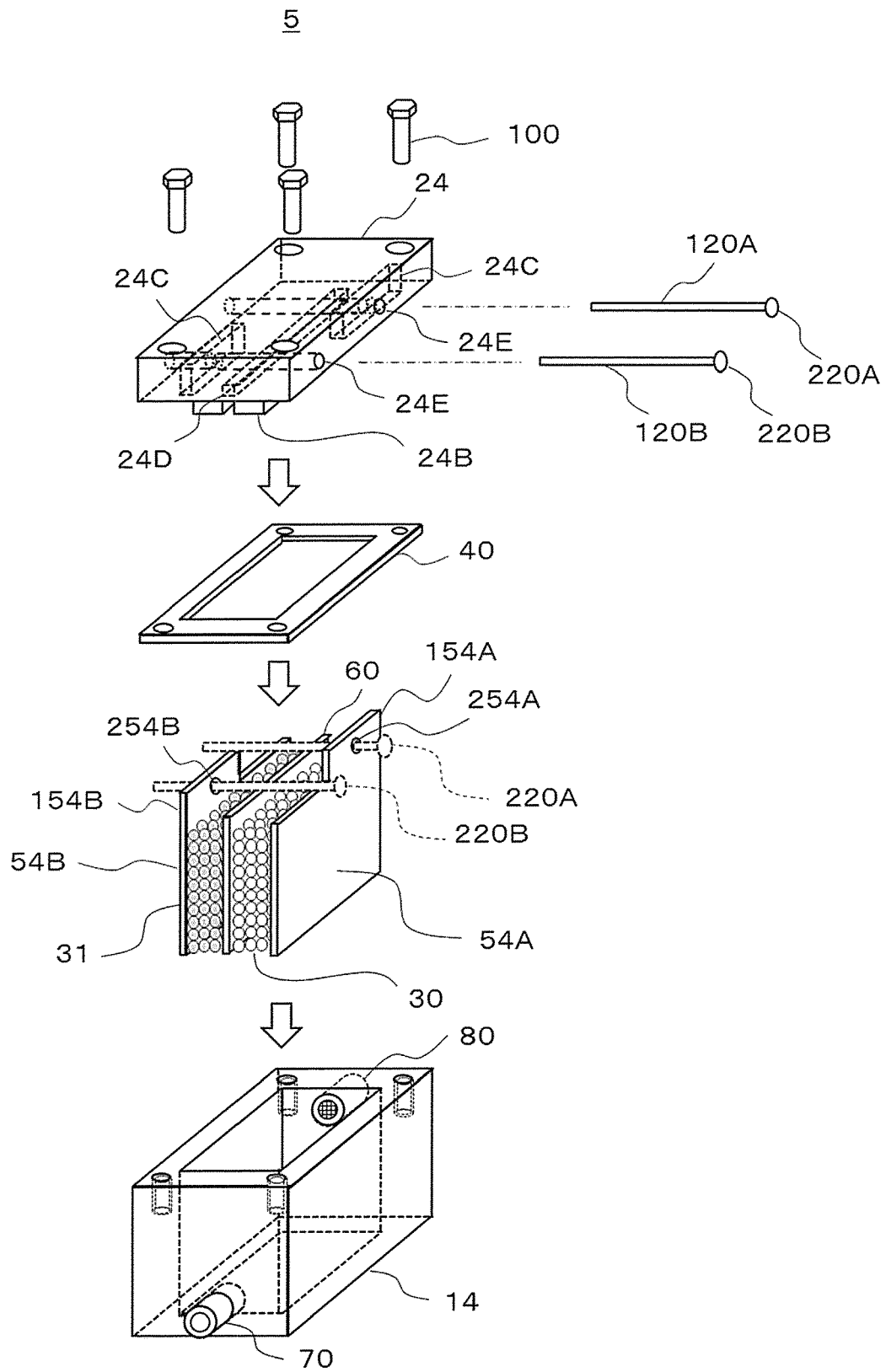
FIG. 9 is an exploded view of a water treatment device in a second embodiment of the present invention.

FIG. 9 is an exploded view of a water treatment device 5 according to a second embodiment of the present invention. The water treatment device 5 according to the second embodiment is different from the water treatment device 1 of the first embodiment in shapes of a terminal 154A of a collector 54A and a terminal 154B of a collector 54B. Further, the water treatment device 5 of the second embodiment is different from the water treatment device of the first embodiment in that the terminals 154A and 154B are formed so as not to project from a lid 24 or a treatment container 14 and the terminals 154A and 154B are energized via terminal bars 120A and 120B.

Other configurations are the same as those of the first embodiment.

As illustrated in FIG. 9, in the water treatment device 5 of the second embodiment, a separator groove 24D and a pair of collector grooves 24C, 24C are formed in the lid 24. Further, a pair of terminal-bar insertion holes 24E, 24E are formed through the lid 24. Each of the collectors 54A and 54B is formed so as to have a shape obtained by cutting out a rectangle from one of four corners of a rectangle. In corner portions each being adjacent to the cutout corner, a terminal port 254A to be connected to the terminal bar 120A and a terminal port 254B to be connected to the terminal bar 120B are formed, respectively.

For the water treatment device 5 of the second embodiment, the separator 60 and the collectors 54A and 54B are first arranged in the treatment container 14. Then, the first electrode 30 is arranged between the separator 60 and the collector 54A, whereas the second electrode 31 is arranged between the separator 60 and the collector 54B. After the packing 40 is mounted onto the treatment container 14, the lid 24 is placed thereon. At this time, an upper end of the separator 60 is inserted into the separator groove 24D formed in the lid 24. Further, the terminal 154A of the collector 54A and the terminal 154B of the collector 54B are inserted into the pair of collector grooves 24C, 24C formed in the lid 24, respectively. The four screws 100 are inserted into screw holes of the lid 24 and fastened so as to press the first electrode 30 and the second electrode 31 with a pressing portion 24B of the lid 24. Then, the terminal bar 120A and the terminal bar 120B are inserted into the pair of terminal-bar insertion holes 24E, 24E formed through the lid 24.

In the water treatment device 5 of the second embodiment, the positive side of the power supply is connected to a terminal 220A of the terminal bar 120A and the negative side of the power supply is connected to a terminal 220B of the terminal bar 120B so as to apply a positive voltage to the collector 54A and a negative voltage to the collector 54B. In this manner, the positive voltage and the negative voltage can be respectively applied to the collectors 54A and 54B adjacent to each other, and hence the positive voltage and the negative voltage can be applied to the first electrode 30 and the second electrode 31, respectively. The polarities of the voltage to be respectively applied to the collectors 54A and 54B are appropriately determined.

According to the water treatment device 5 of the second embodiment, the terminal 154A of the collector 54A and the terminal 154B of the collector 54B are formed so as not to project from the lid 24 or the treatment container 14 to the outside. Therefore, damage of the terminals 154A and 154B due to collision against an object around the water treatment device 1 can be prevented. Further, contact of a conductive member therearound with the terminals 154A and 154B can be prevented so as to prevent short-circuiting of the terminals 154A and 154B.

Figure 10:
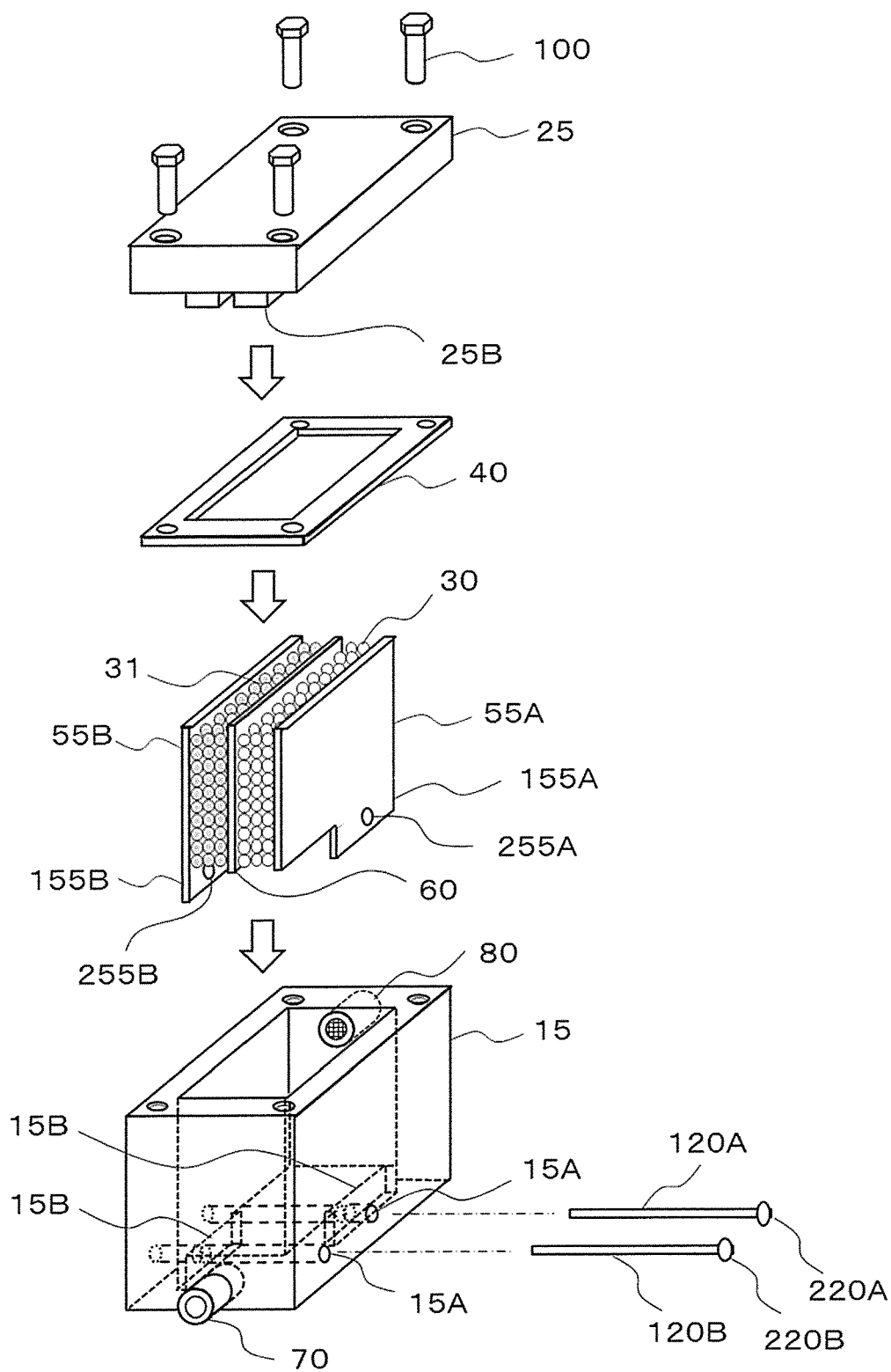
FIG. 10 is an exploded view of a first modification example of the water treatment device in the second embodiment of the present invention.

In the second embodiment, the terminals 120A and 120B are inserted into the terminal-bar insertion holes 24E, 24E formed through the lid 24 to be connected to the terminal 154A of the collector 54A and the terminal 154B of the collector 54B. However, the insertion and the connection of the collectors are not limited thereto. For example, as in a case of a water treatment device 6 of a first modification example of the second embodiment, which is illustrated in FIG. 10, a pair of terminal-bar insertion holes 15A, 15A and a pair of collector grooves 15B, 15B may be formed through and in a treatment container 15. In this case, a terminal 155A of a collector 55A and a terminal 155B of a collector 55B are inserted on a bottom surface side of the treatment container 15.

Figure 11:
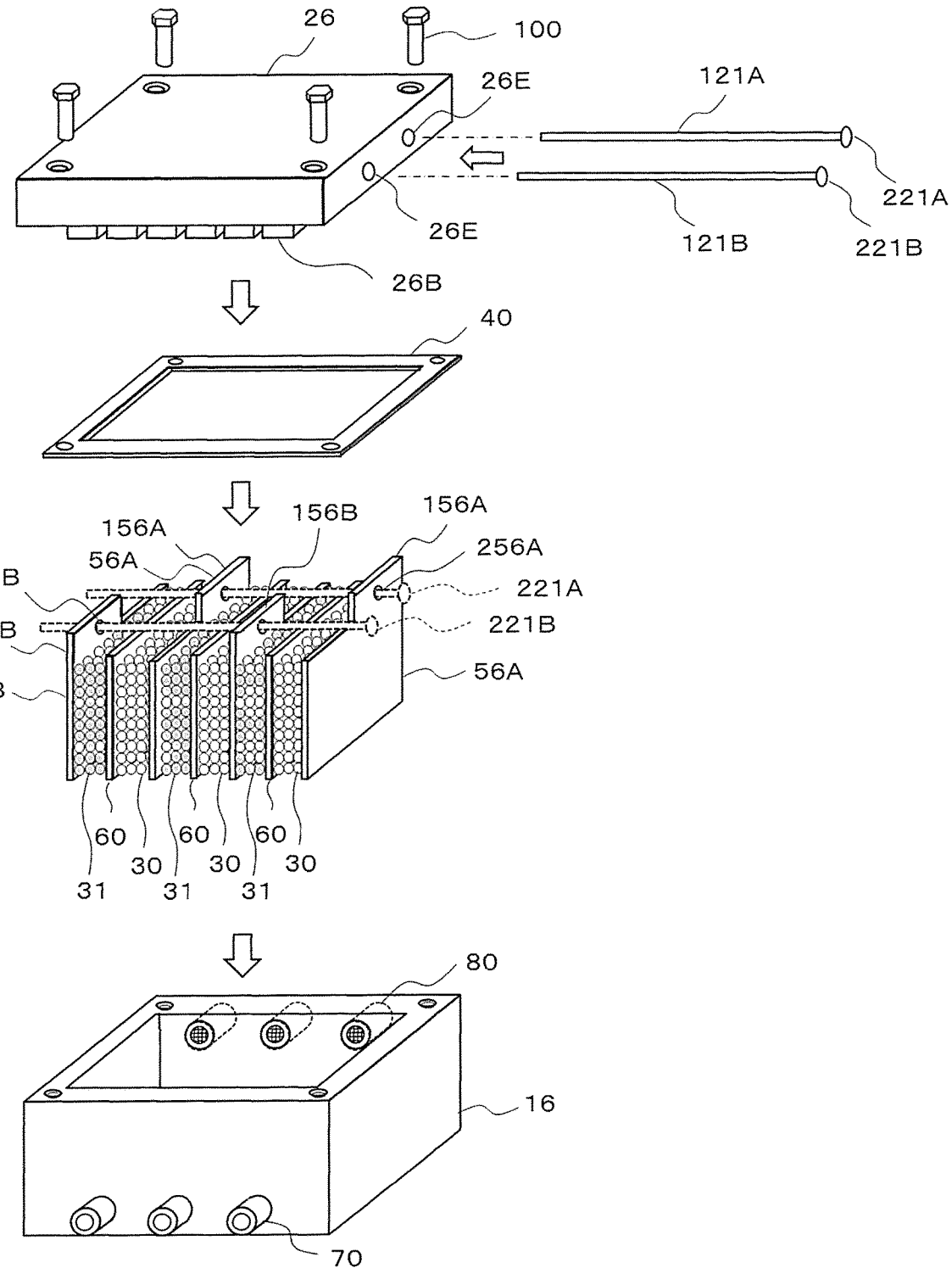
FIG. 11 is an exploded view of a second modification example of the water treatment device in the second embodiment of the present invention.

Further, in the water treatment device 5 of the second embodiment, the pair of collectors 54A, 54B are arranged in the treatment container 14. However, the arrangement of the collectors is not limited thereto. For example, as in a case of a water treatment device 7 of a second modification example illustrated in FIG. 11, two collectors 56A and two collectors 56B may be arranged alternately, and three sets, each including the separator 60, the first electrode 30, and the second electrode 31, are arranged so that each set is located in each space between the collector 56A and the collector 56B. In this case, three of each of the inlet ports 70 and the outlet ports 80 are arranged. With the arrangement described above, capability of treating the water to be treated can be enhanced. The number of each of the collectors 56A and 56B is not limited to two and may be three or more.

Figure 12:
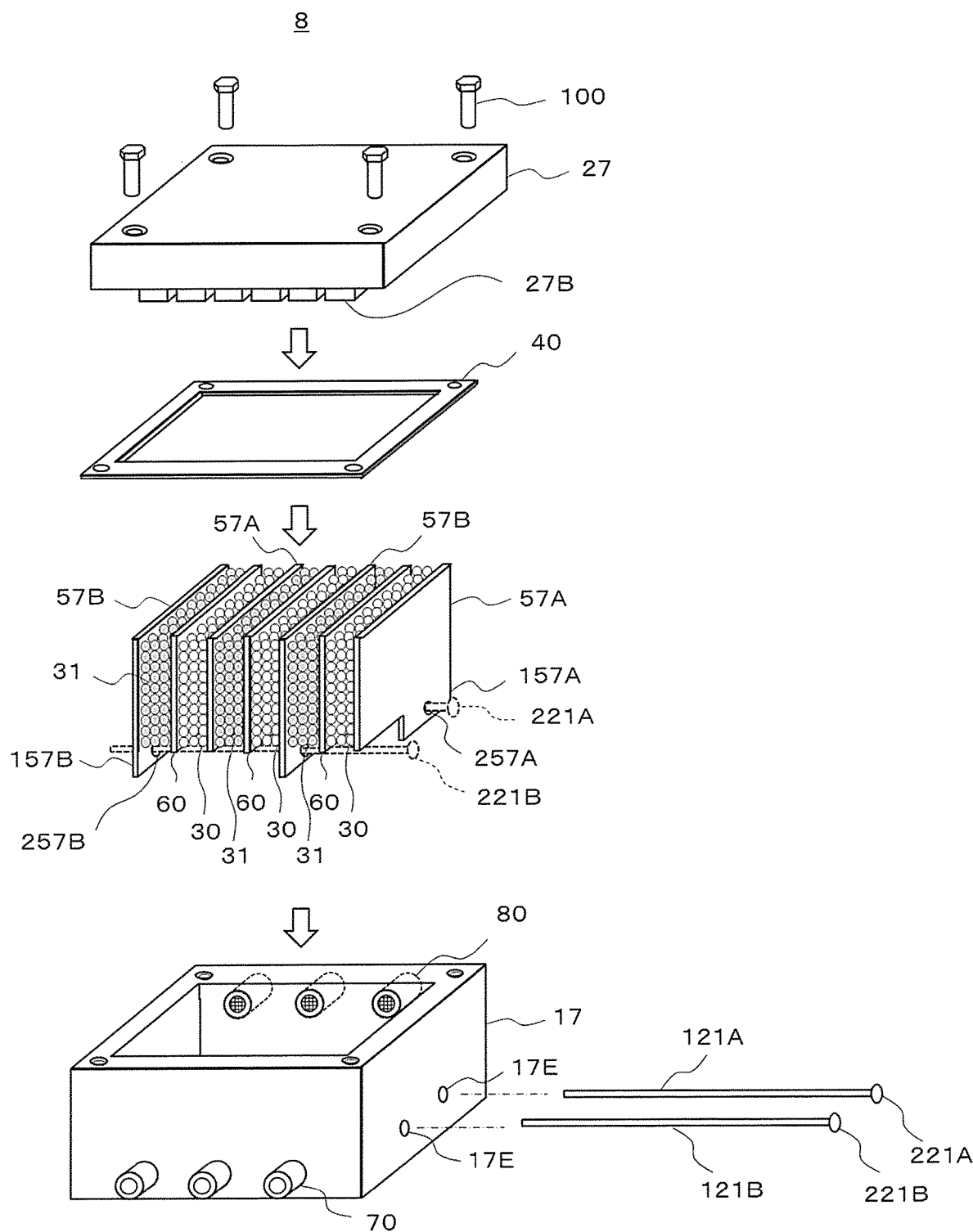
FIG. 12 is an exploded view of a third modification example of the water treatment device in the second embodiment of the present invention.

Further, as in a case of a water treatment device 8 of a third modification example illustrated in FIG. 12, a plurality of the water treatment devices 6 of the first modification example may be arranged side by side. In this case, as illustrated in FIG. 12, a terminal 157A of a collector 57A and a terminal 157B of a collector 57B are arranged in a staggered manner. With the arrangement described above, a positive voltage can be applied to the terminals 157A of the two collectors 57A with use of the one terminal bar 121A, whereas a negative voltage can be applied to the terminals 157B of the two collectors 57B with use of the one terminal bar 121B. The polarities of the voltage to be applied to the collectors 57A and 57B are appropriately determined.

Third Embodiment

Figure 13:
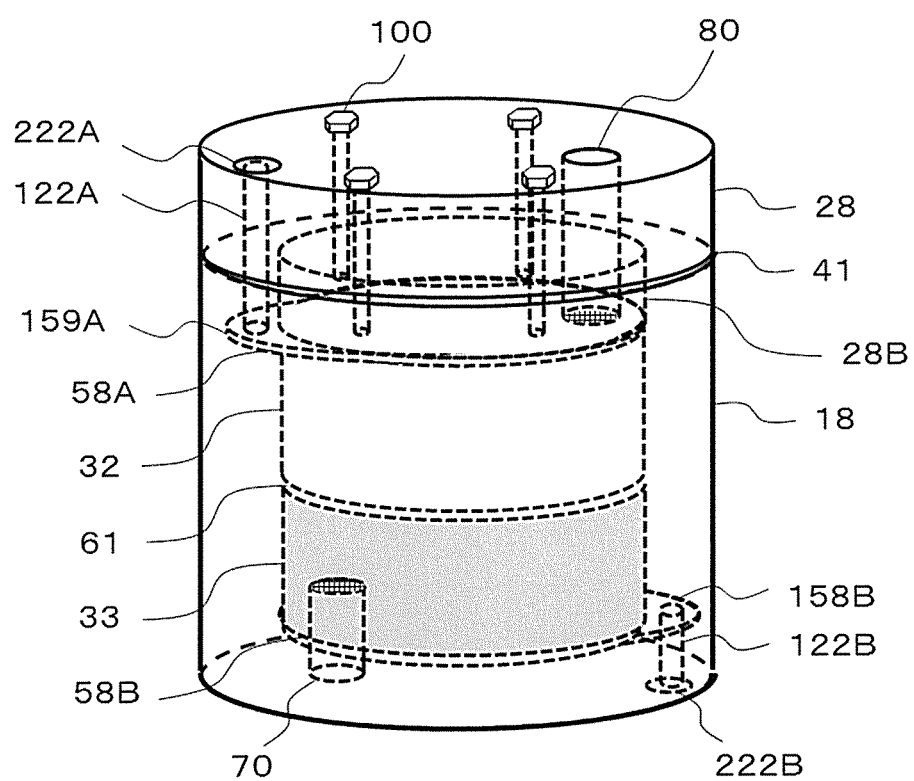
FIG. 13 is a perspective view for illustrating a water treatment device in a third embodiment of the present invention.

FIG. 13 is a view for illustrating a water treatment device 9 according to a third embodiment of the present invention. As illustrated in FIG. 13, the water treatment device 9 includes a treatment container 18 and a lid 28. The treatment container 18 is configured to treat water to be treated. A packing 41 is arranged between the treatment container 18 and the lid 28. The lid 28 is fastened onto the treatment container 18 with the four screws 100. An inlet port 70 for the water to be treated is arranged through the treatment container 18, whereas an outlet port 80 for the treated water is formed through the lid 28.

In the treatment container 18, a pair of collectors 58A, 58B are arranged through a separator 61 interposed therebetween. A first electrode 32 is arranged between the collector 58A and the separator 61, whereas a second electrode 33 is arranged between the collector 58B and the separator 61. A pressing portion 28B to be brought into contact with the collector 58A is formed on the lid 28. Through the fastening of the lid 28 onto the treatment container 18 with the four screws 100, the pressing portion 28B presses the first electrode 32 and the second electrode 33 through the collector 58A.

As illustrated in FIG. 13, the collector 58A has a terminal 159A, whereas the collector 58B has a terminal 158B. A terminal bar 122A arranged so as to pass through the lid 28 is connected to the terminal 159A of the collector 58A, whereas a terminal bar 122B arranged so as to pass through the lid 28 is connected to the terminal 158B of the collector 58B. In the water treatment device 9, a positive side of a power supply (not shown) is connected to a terminal 222A of the terminal bar 122A provided through the lid 28 and a negative side is connected to a terminal 222B of the terminal bar 122B provided in the treatment container 18. As a result, a positive voltage is applied to the first electrode 32, whereas a negative voltage is applied to the second electrode 33.

In the water treatment device 9 of the third embodiment, a thickness of the first electrode 32 and a thickness of the second electrode 33 are not specified. Thus, the thickness of the first electrode 32 and the thickness of the second electrode 33 can be changed by changing the amount of conductive material. In this manner, the deionization performance can be controlled.

Further, in the water treatment device 9 of the third embodiment, the first electrode 32 and the second electrode 33 are pressed with the pressing portion 28B of the lid 28 in a direction of being interposed between the collectors 58A and 58B. In this manner, the collectors 58A and 58B, the first electrode 32, and the second electrode 33 can be brought into close contact with each other. Thus, an electric resistance during the deionization treatment can be reduced.

Next, a system configuration using the water treatment device of the present invention is described based on the water treatment device 1 of the first embodiment. The same description applies when the other water treatment devices 2 to 9 of the present invention are used.

Figure 14:
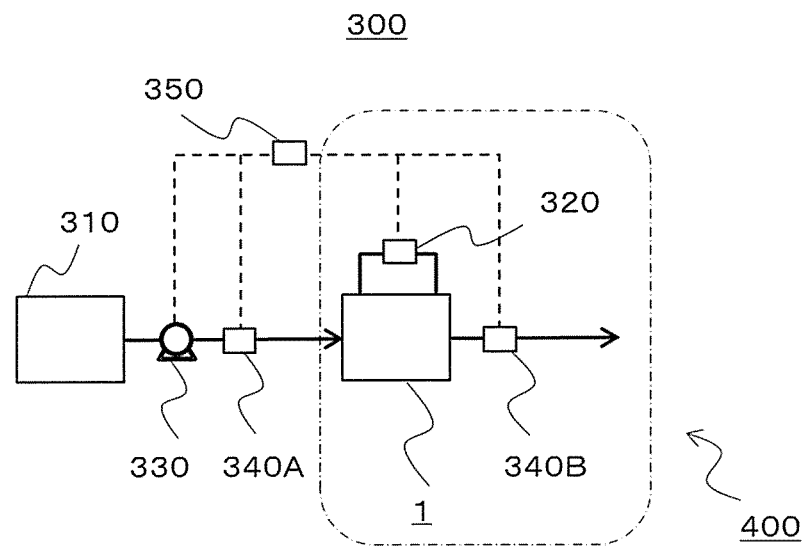
FIG. 14 is a view for illustrating a water treatment system using the water treatment device of the present invention.

FIG. 14 is a diagram for illustrating a water treatment system 300 using the water treatment device 1 of the present invention. The water treatment system 300 includes the water treatment device 1, a power supply unit 320, a tank 310 for water to be treated, a pump 330, a control unit 350, and detection units 340A and 340B.

The water treatment system 300 is configured to introduce the water to be treated, which is pumped up by the pump 330 from the tank 310 for water to be treated, into the water treatment device 1. The detection unit 340A is arranged in a flow passage between the pump 330 and the water treatment device 1, whereas the detection unit 340B is arranged in a flow passage on a discharge side of the water treatment device 1. The detection units 340A and 340B are configured to measure, for example, an electrical conductivity, a pressure loss, a hardness, or a removal target ion concentration of the water to be treated. When the water to be treated is subjected to the deionization treatment in the water treatment device 1, the detection unit 340B can measure, for example, an electrical conductivity, a pressure loss, a hardness, or a removal target ion concentration of the deionized treated water. When the deionization treatment is not conducted in the water treatment device 1, the detection unit 340B measures, for example, the electrical conductivity, the pressure loss, the hardness, or the removal target ion concentration of the water to be treated. The power supply unit 320 is connected to the water treatment device 1. The power supply unit 320, the pump 330, and the detection units 340A and 340B are controlled by the control unit 35.

Figure 15:
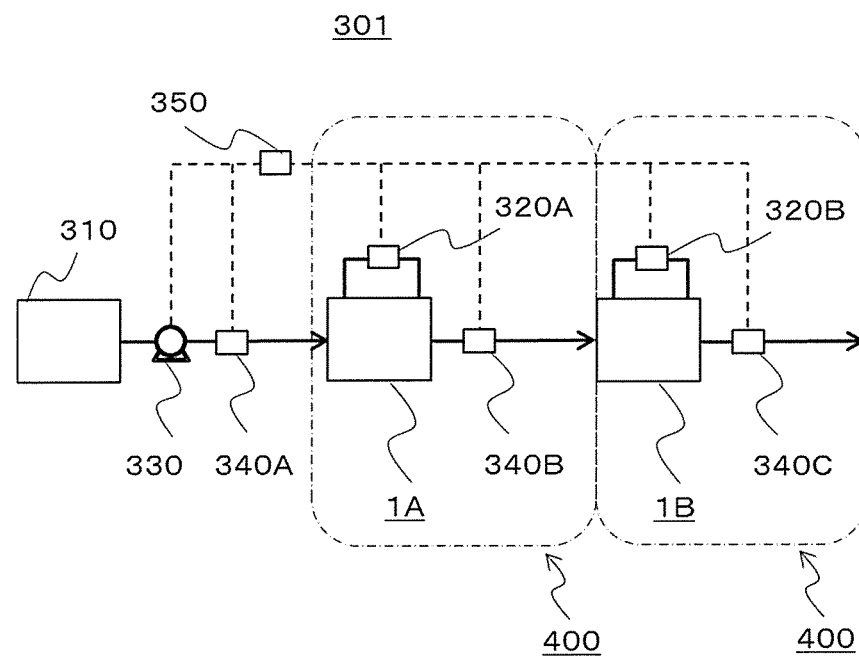
FIG. 15 is a view for illustrating a first modification example of the water treatment system.

The water treatment system 300 is configured to include the single water treatment device 1. However, a configuration of the water treatment system 300 is not limited thereto. For example, as in a case of a water treatment system 301 of a first modification example illustrated in FIG. 15, two water treatment devices 1A and 1B may be connected in series. With the configuration described above, the water to be treated can be treated to have a low electrical conductivity. Three or more water treatment devices 1 may be connected in series.

Figure 16:
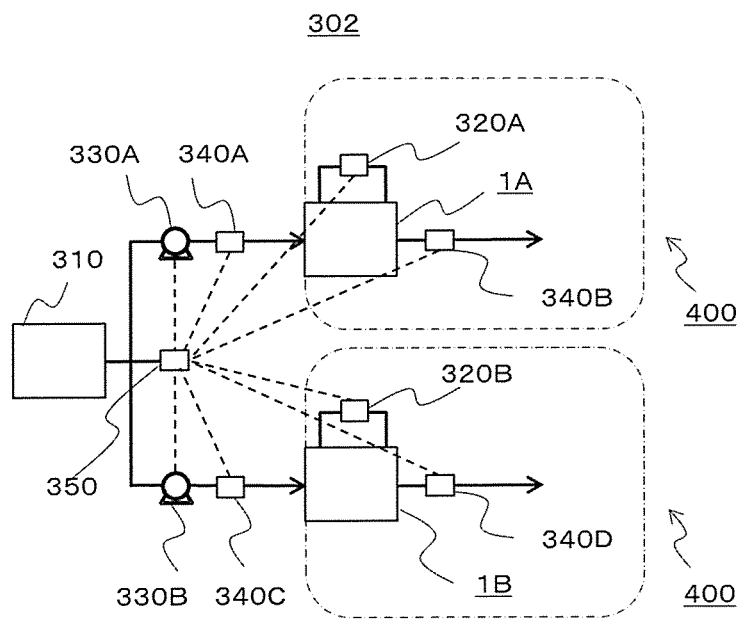
FIG. 16 is a view for illustrating a second modification example of the water treatment system.

Further, as in a case of a water treatment system 302 of a second modification example illustrated in FIG. 16, two water treatment devices 1A and 1B may be connected in parallel. With the configuration described above, the water to be treated can be treated to have a low electrical conductivity. With the configuration described above, a water amount to be subjected to the deionization treatment per unit time can be increased. Three or more water treatment devices 1 may be connected in parallel.

Figure 17:
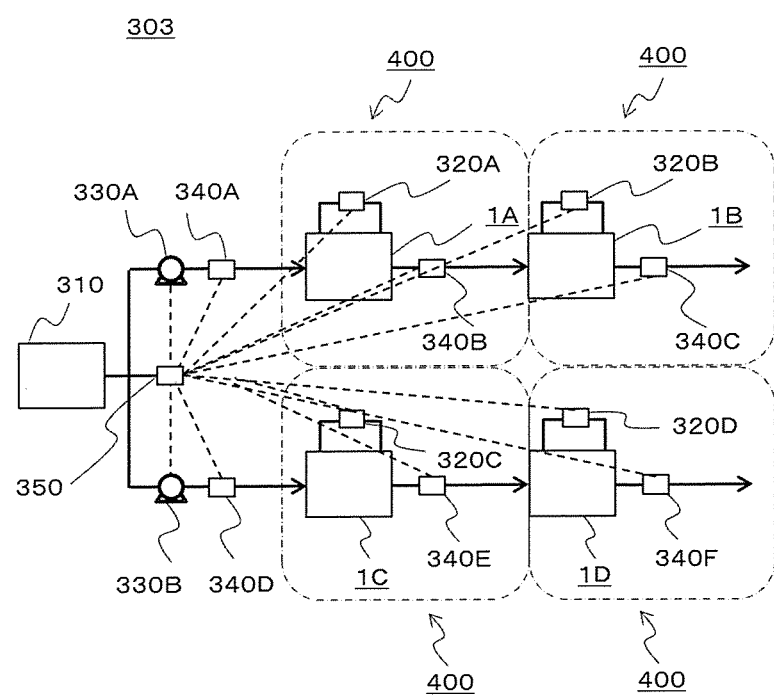
FIG. 17 is a view for illustrating a third modification example of the water treatment system.

Further, as in a case of a water treatment system 303 of a third modification example illustrated in FIG. 17, a set of the two water treatment devices 1A and 1B arranged in series and a set of two water treatment devices 1C and 1D arranged in series may be connected in parallel. With the configuration described above, the water to be treated can be treated to have a low electrical conductivity. Through the treatment describe above, the water amount to be subjected to the deionization treatment per unit time can be increased. Three or more water treatment devices 1 may be connected in parallel. With the connection described above, the water amount to be subjected to the deionization treatment per unit time can be increased, while the water to be treated can be treated to have a low electrical conductivity.

The water treatment systems 300 to 303 are applicable to a water treatment for, for example, water purification, sewage, drainage, or desalination. Further, the water treatment systems 300 to 303 are applicable also to production of sprinkling water for an air-conditioner, cooling water, water for production, and water for washing. Further, the water treatment system described above may be combined with a water heater, a dishwasher, a washing machine, a cold/hot water system, an electric water heater, and a humidifier, and may be used as a water purifier. Besides the devices and machines described above, the water treatment system described above may be combined with or mounted on a device that requires deionized water.

Fourth Embodiment

Figure 20:
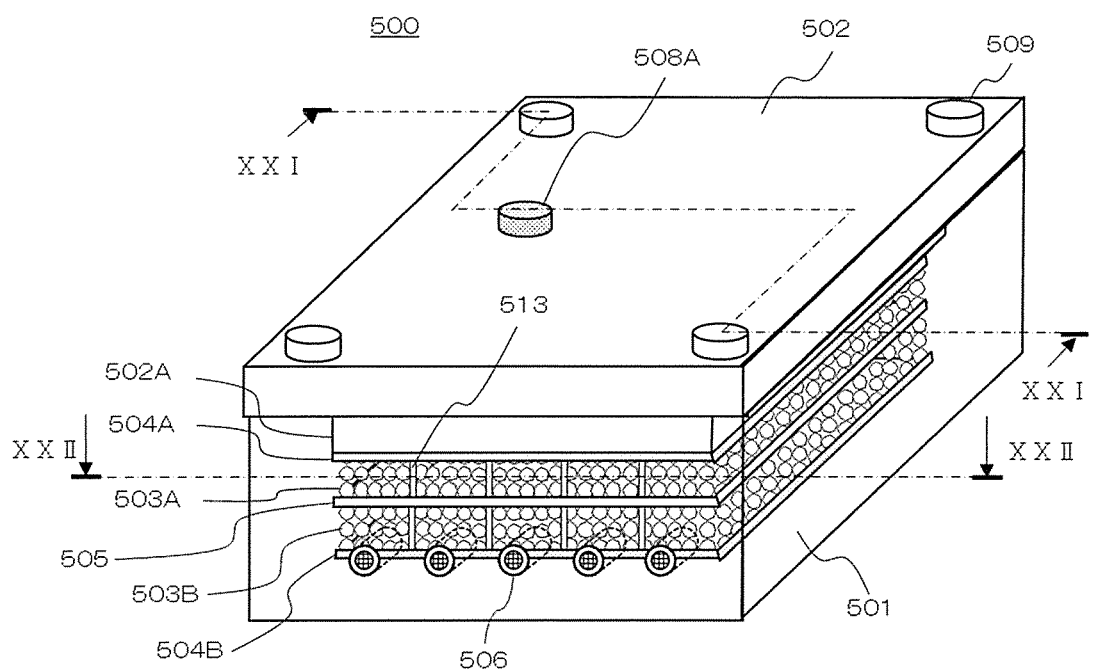
FIG. 20 is a perspective view for illustrating a water treatment device in a fourth embodiment of the present invention.
Figure 21:
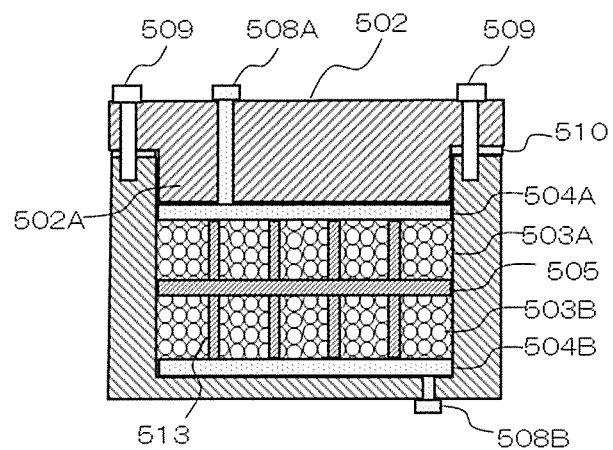
FIG. 21 is a sectional view of the water treatment device taken along the line XXI-XXI of FIG. 20.
Figure 22:
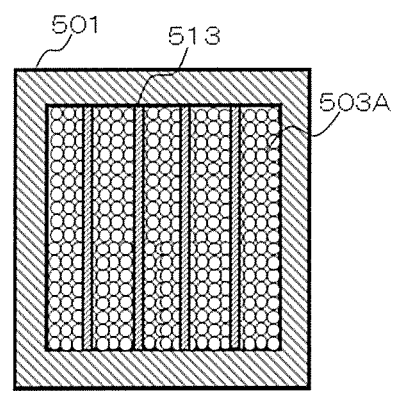
FIG. 22 is a sectional view of the water treatment device taken along the line XXII-XXII of FIG. 20.
Figure 23:
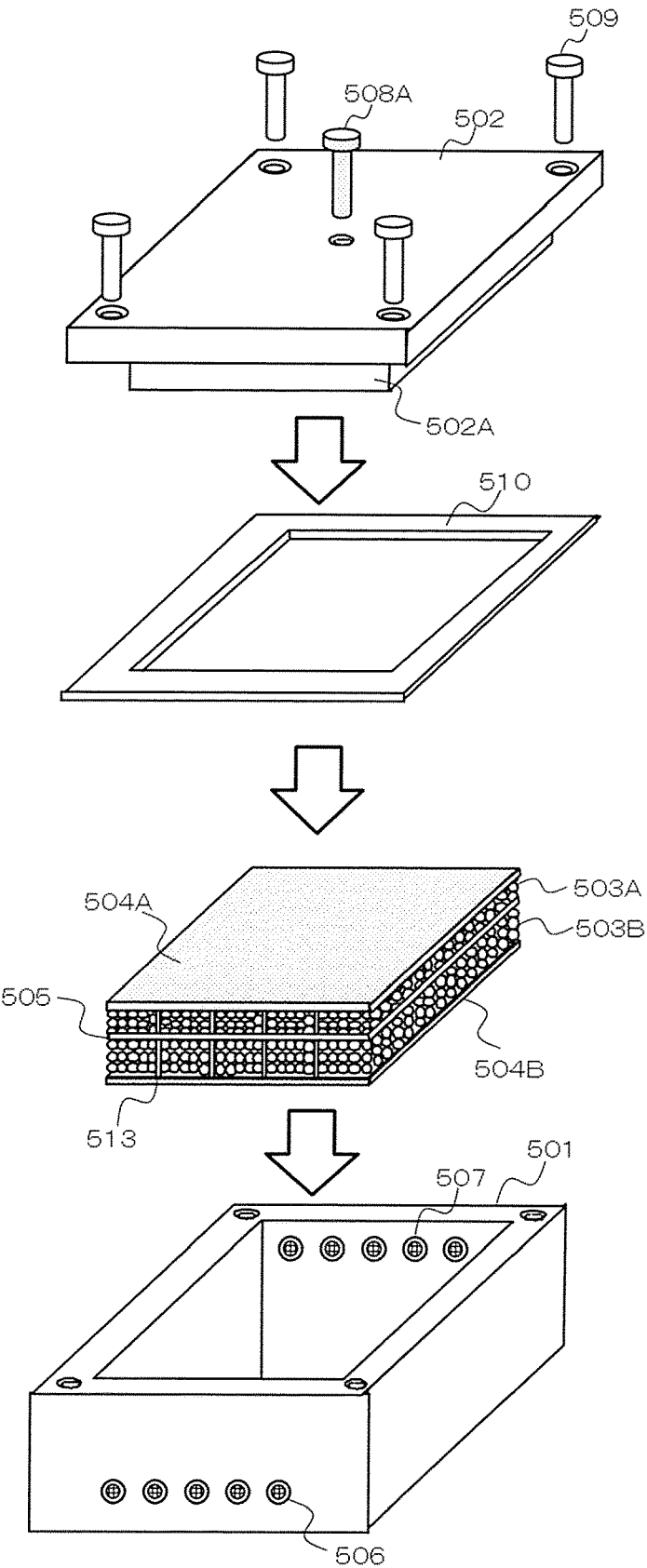
FIG. 23 is an exploded view of the water treatment device in the fourth embodiment of the present invention.

FIG. 20 is a perspective view for illustrating a water treatment device 500 according to a fourth embodiment of the present invention. FIG. 21 is a sectional view of the water treatment device taken along the line XXI-XXI of FIG. 20. FIG. 22 is a sectional view of the water treatment device taken along the line XXII-XXII of FIG. 20. FIG. 23 is an exploded view of the water treatment device 500 according to the fourth embodiment of the present invention.

As illustrated in FIG. 20 to FIG. 23, the water treatment device 500 includes a treatment container 501 and a lid 502. The treatment container 501 is configured to treat water to be treated. A packing 510 is arranged between the treatment container 501 and the lid 502. The lid 502 is fastened onto the treatment container 501 with four screws 509. The treatment container 501 has five inlet ports 506 and five outlet ports 507 for the water to be treated. When water leakage does not occur without the packing 510 after the treatment container 501 and the lid 502 are fastened with the screws 509 and a liquid such as the water to be treated is injected, the packing 510 is not required to be provided. Further, a member other than the packing 510 may be used as long as the member can prevent the water leakage, which may occur after the treatment container 501 and the lid 502 are fastened with the screws 509 and the liquid such as the water to be treated is injected.

In the treatment container 501, a pair of collectors 504A, 504B are arranged through a separator 505 interposed therebetween. A first electrode 503A is arranged between the collector 504A and the separator 505, whereas a second electrode 503B is arranged between the collector 504B and the separator 505. Four partition plates 513 are arranged across the first electrode 503A and the second electrode 503B.

As a material for comprising each of the partition plates 513, for example, a graphite sheet, a grafoil (commercial name), a conductive rubber, a metal plate, a resin plate, a resin sheet, and wood are given. Any material may be used as long as the first electrode 503A and the second electrode 503B are partitioned. The partition plates 513 may have water permeability. Further, the partition plates 513 may have electrical conductivity.

A pressing portion 502A to be brought into contact with the collector 504A is formed on the lid 502. Through the fastening of the lid 502 onto the treatment container 501 with the four screws 509, the pressing portion 502A presses the first electrode 503A and the second electrode 503B through the collector 504A. As materials of the treatment container 501, the lid 502, the pressing portion 502A, the first electrode 503A, the second electrode 503B, the collectors 504A and 504B, the separator 505, the inlet ports 506, and the outlet ports 507, the same materials as those in the first embodiment are used.

As illustrated in FIG. 21, a terminal 508A is connected to the collector 504A, whereas a terminal 508B is connected to the collector 504B. With application of a voltage across the terminals 508A and 508B, the voltage is applied across the collectors 504A and 504B, specifically, across the first electrode 503A and the second electrode 503B.

In the water treatment device 500 of the fourth embodiment, as in the water treatment device 9 of the third embodiment, a thickness of the first electrode 503A and a thickness of the second electrode 503B are not determined by the collectors 504A and 504B and the separator 505. Thus, the thickness of the first electrode 503A and the thickness of the second electrode 503B can be changed by changing the amount of conductive material. With the change in thickness, the deionization performance can be changed and controlled.

Further, in the water treatment device 500 of the fourth embodiment, the first electrode 503A and the second electrode 503B are pressed with the pressing portion 502A of the lid 502 in a direction of being interposed between the collectors 504A and 504B. In this manner, the collectors 504A and 504B, the first electrode 503A, and the second electrode 503B can be brought into close contact with each other. Thus, an electric resistance during the deionization treatment can be reduced.

In the water treatment device 500 of the fourth embodiment, the first electrode 503A and the second electrode 503B are comprised solely of a conductive material, and an additive such as a binder for binding constituent materials to each other is not used, as in the first embodiment. Thus, clearances are ensured between the first electrode 503A adjacent thereto and between the first electrode 503B adjacent thereto. With the clearances, the water to be treated can be directly injected into the first electrode 503A and the second electrode 503B. Further, the treated water can be directly discharged from the first electrode 503A and the second electrode 503B. Thus, a pressure loss of the water treatment device 500 can be reduced.

Further, in the water treatment device 500 of the fourth embodiment, the plurality of partition plates 513 are arranged across the first electrode 503A and the second electrode 503B. With the plurality of partition plates 513, the water to be treated is uniformly spread into the first electrode 503A and the second electrode 503B. In this manner, generation of a short path for the treated water, which is one of factors of reduction of the deionization performance, in the treatment container 501 can be suppressed. Thus, even when an area of each of the first electrode 503A and the second electrode 503B is increased, stable deionization performance is obtained.

In the water treatment device 500 of the fourth embodiment, the inlet ports 506 and the outlet ports 507 are arranged through side surfaces of the treatment container 501, which are opposed to each other. However, the arrangement of the inlet ports 506 and the outlet ports 507 is not limited thereto. The inlet ports 506 and the outlet ports 507 may be arranged at any positions as long as the inlet ports 507 and the outlet ports 507 are opposed to each other through the first electrode 503A and the second electrode 503B therebetween. For example, the inlet ports 506 may be arranged through a bottom of the treatment container 501, whereas the outlet ports 507 may be arranged through the lid 502.

In this case, it is preferred that holes be arranged through the collectors 504A and 504B or a material having water permeability be used for the collectors 504A and 504B so that the liquid can be injected from the inlet ports 506 into the second electrode 503B and the liquid can flow out of the first electrode 503A through the outlet ports 507. Further, the inlet ports 506 may be arranged through a side surface of the treatment container 501, whereas the outlet ports 507 may be arranged through the lid 502.

In the fourth embodiment, in order to directly inject the water to be treated into the first electrode 503A, the inlet ports 506 are arranged so as to correspond to five segments of the first electrode 503A, which are defined by the four partition plates 513, respectively. Further, in order to directly discharge the water to be treated from the second electrode 503B, the outlet ports 507 are arranged so as to correspond to five segments of the second electrode 503B, which are defined by the four partition plates 513, respectively. The number of inlet ports 506 and the number of outlet ports 507 are not limited to those describe above. In order to retain the water to be treated in the first electrode 503A and the second electrode 503B for a long period of time, it is desired that a distance between the inlet ports 506 and the outlet ports 507 be large. Thus, the number of inlet ports 506 and the number of outlet ports 507 may be one for each. Even in this case, the inlet ports 506 and the outlet ports 507 are arranged at such positions that the water to be treated can be directly introduced to or the water to be treated can be directly discharged from one or both of the first electrode 503A and the second electrode 503B. When the water to be treated is directly introduced into both of the first electrode 503A and the second electrode 503B, the inlet ports 506 and the outlet ports 507 may be arranged at such positions as to be opposed to the separator 505.

Further, in the fourth embodiment, one for each of the first electrode 503A, the second electrode 503B, the collector 504A, and the collector 504B is arranged. However, the number of each of the first electrode 503A, the second electrode 503B, the collector 504A, and the collector 504B is not limited thereto. For example, as in a modification example illustrated in FIG. 24, a plurality of the first electrodes 503A, the second electrodes 503B, the collectors 504A, and the collectors 504B may be arranged, respectively.

Figure 24:
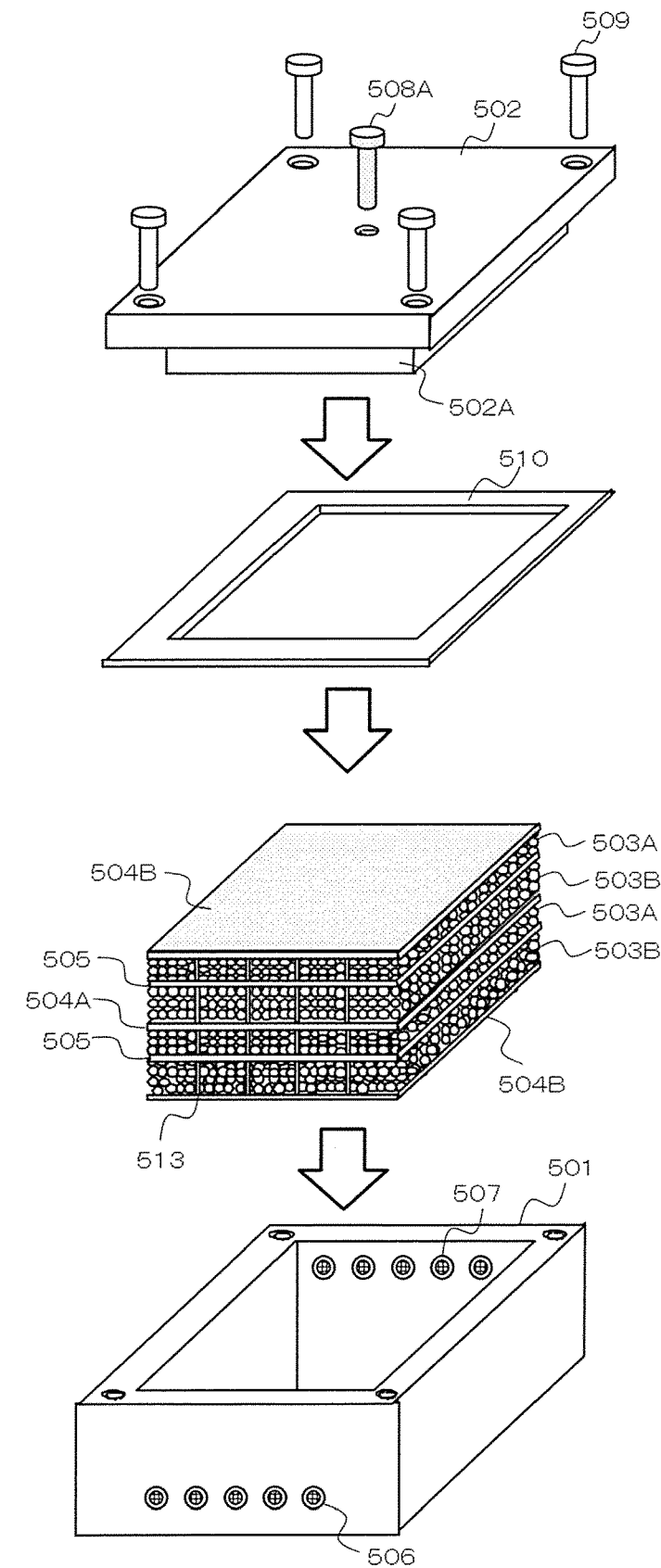
FIG. 24 is a view for illustrating a modification example of the water treatment device in the fourth embodiment of the present invention.

When the plurality of first electrodes 503A, second electrodes 503B, collectors 504A, and collectors 504B are arranged, respectively, as in the modification example illustrated in FIG. 24, passage ports are arranged in the collectors 504A and 504B or the collectors 504A and 504B are arranged of a material having water permeability so that a liquid can pass therethrough.

In the case of the modification example illustrated in FIG. 24, a voltage may be applied to each of the collectors 504B, which are arranged so as to be held in contact with the lid 502, and the collectors 504B, which is arranged so as to be held in contact with a bottom of the treatment container 501. With the configuration described above, the modification example illustrated in FIG. 24 is configured as a bipolar stack in which a voltage is applied solely to stack ends of the first electrodes 503A, the second electrode 503B, the collector 504A, and the collectors 504B, which are stacked.

Further, for example, a terminal may be provided to each of the collector 504A and the collectors 504B and connected to a power supply so that the voltage is applied across the collector 504A and each of the collectors 504B. In this case, a unipolar stack in which the voltage is applied across the collector 504A and each of the collectors 504B is formed.

Further, in the water treatment device 500 of the fourth embodiment, the lid 502 is fastened onto the treatment container 501 with the four screws 509. However, the number of screws 509 may be larger than five or equal to or smaller than three.

Fifth Embodiment

Figure 25:
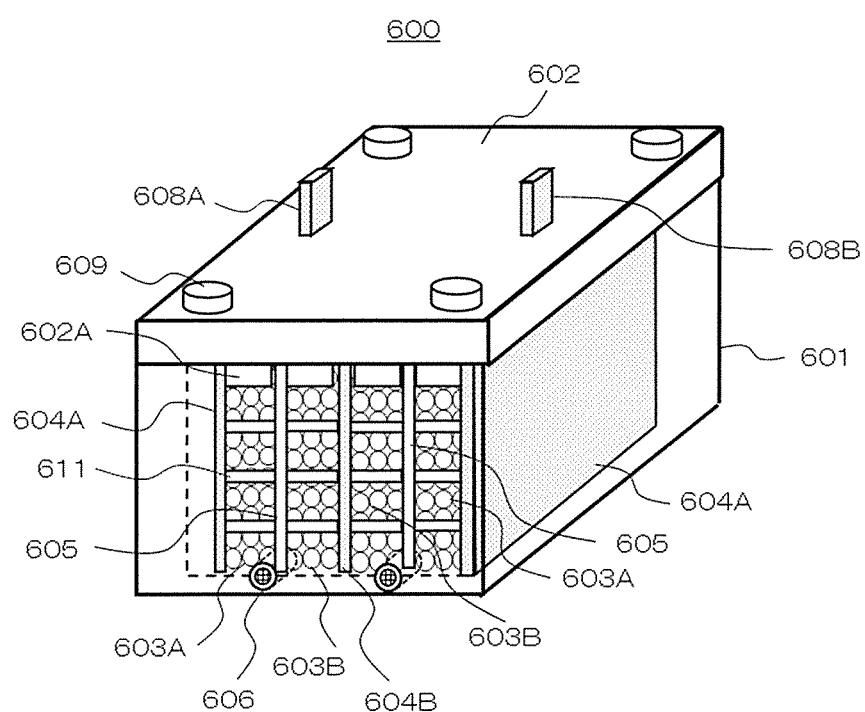
FIG. 25 is a perspective view for illustrating a water treatment device in a fifth embodiment of the present invention.

FIG. 25 is a perspective view for illustrating a water treatment device 600 according to a fifth embodiment of the present invention. The water treatment device 600 is one of modification examples of the first embodiment.

The water treatment device 600 includes two collectors 604A and one collector 604B, which are arranged alternately. Between each of the collectors 604A and the collector 604B, there are arranged a separator 605, a first electrode 603A, and a second electrode 603B. The first electrode 603A and the second electrode 603B are separated from each other by the separator 605.

The first electrode 603A and the second electrode 603B, which are separated from each other by the separator 605, are each divided into four segments by three partition plates 611 orthogonal to the separator 605. The partition plates 611 are not required to be orthogonal to the separators 605 as long as the partition plates 611 are not parallel to the separators 605, the collectors 604A, and the collector 604B. Further, a terminal 608A and a terminal 608B of the water treatment device 600 of the fifth embodiment are provided only to the collectors 604A, which are held in contact with the treatment container 601.

As described above, in the water treatment device 600 of the firth embodiment, each of the first electrodes 603A and the second electrodes 603B is divided by the plurality of partition plates 611. With the division described above, in the water treatment device 600 of the fifth embodiment, even when an area of each of the first electrodes 603A and the second electrodes 603B is increased, the water to be treated can be uniformly spread into the first electrodes 603A and the second electrodes 603B.

With the configuration described above, the water treatment device 600 of the fifth embodiment can suppress generation of a short path for the treated water, which is one of factors of reduction of the deionization performance, in the treatment container 601. Thus, even when the area of each of the first electrodes 603A and the second electrodes 603B is increased, stable deionization performance is obtained.

Further, in the water treatment device 600 of the fifth embodiment, with the arrangement of the plurality of partition plates 611 across the first electrodes 603A and the second electrode 603B, when the first electrodes 603A and the second electrodes 603B are pressed by the pressing portion 602A, each of the electrodes can be internally pressed in a uniform manner.

Next, results of verification of a deionization effect with use of the water treatment device of the present invention are described with reference to FIG. 18 and FIG. 19. For the verification, the water treatment device 1 of the first embodiment was used.

As the conductive material of the first electrode 30 and the second electrode 31, granular activated carbon was used. A graphite sheet was used for each of the collectors 50A and 50B. Further, each of an interval between the collector 50A and the separator 60 and an interval between the collector 50B and the separator 60 was set to 5 mm. As the water to be treated, water obtained by filtering urban sewage having an electrical conductivity of 2 mS/cm was used. A flow rate during the treatment was set to 0.1 m/min.

Figure 18:
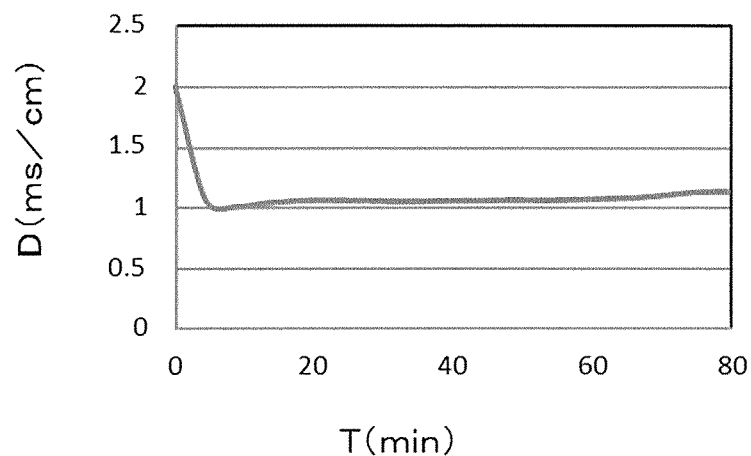
FIG. 18 is a graph for showing a deionization effect of the water treatment device of the present invention.

As a result of execution of the deionization treatment under a state in which the first electrode 30 and the second electrode 31 were pressed, a relationship between an electrical conductivity D of the water to be treated flowing out of the water treatment device 1 and elapsed time T was obtained as shown in FIG. 18. In FIG. 18, the vertical axis represents the electrical conductivity D (mS/cm), whereas the horizontal axis represents the elapsed time T (min). From FIG. 18, it is understood that the electrical conductivity D was decreased from 2 mS/cm to 1 mS/cm within several minutes after start of the deionization treatment. The electric resistance between the collector 50A and the collector 50B was 0.8Ω.

Figure 19:
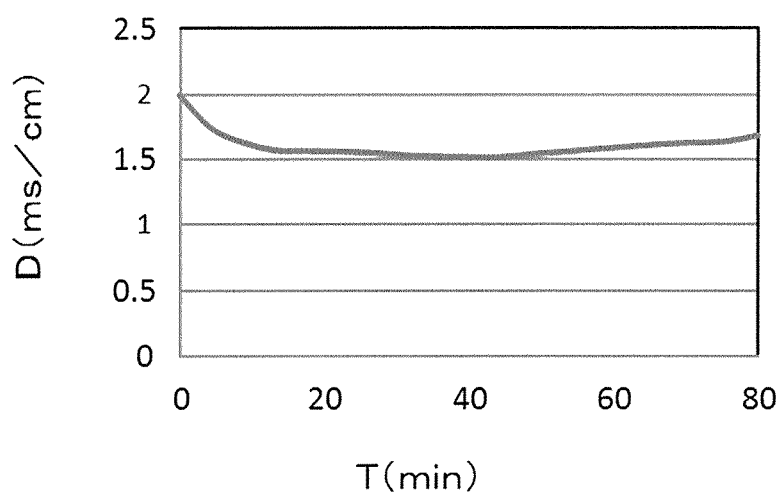
FIG. 19 is a graph for showing a deionization effect in a comparative example of the water treatment device of the present invention.

As a comparative example, a result of execution of the deionization treatment without pressing the first electrode 30 and the second electrode 31 is shown in FIG. 19. In FIG. 19, the vertical axis represents the electrical conductivity D (mS/cm), whereas the horizontal axis represents the elapsed time T (min). From FIG. 19, it is understood that the electrical conductivity D was decreased from 2 mS/cm to 1.5 mS/cm within about twenty minutes from the start of the deionization treatment. The electric resistance between the collector 50A and the collector 50B was 3.6Ω.

From the results described above, it was confirmed that, when the first electrode 30 and the second electrode 31 were pressed, the deionization performance was remarkably improved. Further, it was confirmed that, when the first electrode 30 and the second electrode 31 were pressed, the electric resistance between the collectors 50A and 50B was remarkably decreased. In this manner, the deionization effect of the water treatment device 1 according to the first embodiment was confirmed.

REFERENCE SIGNS LIST

1 to 9, 1A to 1D, 500, 600 water treatment device, 10 to 18, 501, 601 treatment container, 11A, 13A through hole, 15A, 17E, 24E, 26E terminal-bar insertion hole, 15B, 20C, 24C collector groove, 20 to 28, 502, 602 lid, 20A, 22A through hole, 20B to 28B, 502A, 602A pressing portion (pressing member), 20D, 24D separator groove, 30, 32, 503A, 603A first electrode, 31, 33, 503B, 603B second electrode, 40, 510 packing, 50A to 58A, 50B to 58B, 504A, 504B, 604A, 604B collector, 60, 61, 505, 605 separator, 70, 506, 606 inlet port, 80, 507 outlet port, 100, 509, 609 screw, 110 out flow prevention member, 120A to 122A, 120B to 122B terminal bar, 150A to 159A, 150B to 158B, 220A to 222A, 220B to 222B, 508A, 508B, 608A, 608B terminal, 200 press machine, 254A to 257A, 254B to 257B terminal port, 300 to 303 water treatment system, 310 tank for water to be treated, 320, 320A to 320D power supply unit, 330, 330A, 330B pump, 340A to 340F detection unit, 350 control unit, 400 water treatment unit, 505, 605 separator, 513, 611 partition plate.

The invention claimed is:

1. A water treatment device configured to perform a deionization treatment for water to be treated to obtain treated water, the water treatment device comprising:
   a lid,
   a pressing member;
   a treatment container configured to store the water to be treated;
   a first electrode, which has a powdery shape, a granular shape, or a fibrous shape, and is accommodated in the treatment container;
   a second electrode, which has a powdery shape, a granular shape, or a fibrous shape, and is accommodated in the treatment container;
   an inlet port, which is arranged through the treatment container, and is configured to introduce the water to be treated;
   an outlet port, which is arranged through the treatment container, and is configured to discharge the water to be treated or the treated water;
   an outflow prevention member including a resin net or a metal net and configured to prevent the first electrode and the second electrode from flowing out through the outflow port;
   a separator arranged between the first electrode and the second electrode; and
   a pair of collectors, which are accommodated in the treatment container, and are configured to apply a voltage to the first electrode and the second electrode,
   wherein the pressing member is configured to press the first electrode and the second electrode in the treatment container when the lid is mounted to the treatment container.

2. The water treatment device according to claim 1, wherein the inlet port and the outlet port are arranged at such positions as to be opposed to each other through the first electrode and the second electrode therebetween.

3. The water treatment device according to claim 1, wherein the pressing member is arranged on the lid.

4. The water treatment device according to claim 3, wherein the pressing member is formed integrally with the lid.

5. The water treatment device according to claim 1, wherein the lid has a regulating portion configured to regulate a distance between the pressing member and the treatment container.

6. The water treatment device according to claim 1, wherein the pressing member has a projecting portion projecting toward an inside of the treatment container, and
   wherein, when the lid is mounted onto the treatment container, the pressing member presses the first electrode and the second electrode with the projecting portion.

7. The water treatment device according to claim 1, wherein the lid has a separator groove and a pair of collector grooves, which are configured to specify a positional relationship between the separator and the pair of collectors.

8. The water treatment device according to claim 3, wherein the pair of collectors have terminals configured to apply the voltage to the pair of collectors, respectively, and
   wherein, when the pair of collectors are placed in the treatment container, the terminals project from the lid.

9. The water treatment device according to claim 3, wherein the lid has a press machine configured to reciprocate the pressing member toward and from the first electrode and the second electrode, and
   wherein the press machine is configured to control a pressing force of the pressing member on the first electrode and the second electrode.

10. The water treatment device according to claim 1,
wherein the pair of collectors have terminals configured to apply the voltage to the pair of collectors, respectively, and
wherein, when the pair of collectors are placed in the treatment container, the terminals project from the treatment container.

11. The water treatment device according to claim 1,
wherein the pair of collectors have terminal ports, respectively, and
wherein, when the pair of collectors are arranged in the treatment container, the terminal ports of the pair of collectors are arranged to be oriented so as not to be opposed to each other through the separator interposed therebetween.

12. The water treatment device according to claim 1, wherein the treatment container has a pair of collector grooves configured to specify a positional relationship between the pair of collectors.

13. The water treatment device according to claim 1, further comprising a partition plate provided across at least any one of the first electrode and the second electrode to divide at least one of the first electrode and the second electrode.

14. A water treatment system, comprising:
a water treatment device of claim 1;
a power supply unit configured to supply a voltage to the water treatment device;
a pump configured to feed the water to be treated to the water treatment device;
a plurality of detection units configured to detect characteristics of the water to be treated or the treated water; and
a control unit,
wherein the control unit is configured to control the power supply unit, the pump, and the plurality of detection units.

15. A water treatment system, comprising:
a plurality of water treatment units, each comprising:
a water treatment device of claim 1;
a power supply unit configured to supply a voltage to the water treatment device; and
a detection unit configured to detect characteristics of the water to be treated or the treated water;
a pump configured to feed the water to be treated to the plurality of water treatment units, and
a control unit configured to control the power supply units and the detection units of the plurality of water treatment units, and the pump.

16. The water treatment system according to claim 15, wherein the plurality of water treatment units are connected in series.

17. The water treatment system according to claim 15, wherein the plurality of water treatment units are connected in parallel.

18. The water treatment system according to claim 15, wherein the plurality of water treatment units are formed by connecting sets, each including the plurality of water treatment units connected in series, in parallel.

19. A method of assembling a water treatment device, comprising:
arranging a pair of collectors through a separator interposed therebetween in a treatment container;
arranging a first electrode between one of the pair of collectors and the separator;
arranging a second electrode between another one of the pair of collectors and the separator;
arranging an outflow prevention member configured to prevent the first electrode and the second electrode from flowing out through an outlet port, which is arranged through the treatment container, and is configured to discharge water to be treated or treated water obtained through a deionization treatment for the water to be treated;
pressing the first electrode and the second electrode with a pressing member formed on a lid for the treatment container within the treatment container by mounting the lid to the treatment container; and
fixing the lid onto the treatment container after a pressed state of the first electrode and the second electrode becomes a predetermined pressed state.

20. The method of assembling a water treatment device according to claim 19, wherein, in the step of pressing the first electrode and the second electrode with the pressing member formed on the lid for the treatment container, the first electrode and the second electrode are pressed with the pressing member under a state in which a partition plate is arranged across at least any one of the first electrode and the second electrode.

21. The method of assembling a water treatment device according to claim 19, wherein the predetermined pressed state is determined based on a compression ratio of the first electrode and the second electrode.

22. The method of assembling a water treatment device according to claim 19, wherein the predetermined pressed state is determined based on an electric resistance between the pair of collectors.

23. The method of assembling a water treatment device according to claim 19, wherein the predetermined pressed state is determined based on a pressure loss before injection of the water to be treated into the treatment container and after the injection of the water to be treated into the treatment container.

24. A water treatment method, comprising:
arranging a pair of collectors through a separator interposed therebetween in a treatment container;
arranging a first electrode, which has a powdery shape, a granular shape, or a fibrous shape, between one of the pair of collectors and the separator;
arranging a second electrode, which has a powdery shape, a granular shape, or a fibrous shape, between another one of the pair of collectors and the separator;
arranging an outflow prevention member configured to prevent the first electrode and the second electrode from flowing out through an outlet port, which is arranged through the treatment container, and is configured to discharge water to be treated or treated water obtained through a deionization treatment for the water to be treated;
pressing the first electrode and the second electrode with a pressing member formed on a lid for the treatment container within the treatment container by mounting the lid to the treatment container, the pressing member including a projecting portion projecting toward an inside of the treatment container; and
performing a treatment for water to be treated under a state in which the first electrode and the second electrode are pressed by the pressing member formed on the lid in the treatment container.

25. The water treatment method according to claim 24, wherein the state in which the first electrode and the second electrode are pressed by the pressing member formed on the lid for the treatment container in the treatment container comprises a state in which the first electrode and the second electrode are pressed by the pressing member in the treatment container under a state in which a partition plate is arranged across at least any one of the first electrode and the second electrode.

26. The water treatment device according to claim 1, wherein
- the lid includes a first through hole and a second through hole;
- a first one of the pair of collectors includes a first terminal;
- a second one of the pair of collectors includes a second terminal;
- the first terminal is configured to extend through the first through hole; and
- the second terminal is configured to extend through the second through hole.

27. The water treatment device according to claim 13, wherein the partition plate is arranged perpendicular to the at least any of the first electrode and the second electrode.

\* \* \* \* \*